United States Patent [19]
Hekmatpour

[11] Patent Number: 5,822,745
[45] Date of Patent: Oct. 13, 1998

[54] EXPERT SYSTEM AND METHOD EMPLOYING HIERARCHICAL KNOWLEDGE BASE, AND INTERACTIVE MULTIMEDIA/HYPERMEDIA APPLICATIONS

[75] Inventor: Amir Hekmatpour, Burlington, Vt.

[73] Assignee: International Business Machines Corporation, Armonk, N.Y.

[21] Appl. No.: 773,820

[22] Filed: Dec. 27, 1996

Related U.S. Application Data

[62] Division of Ser. No. 235,301, Apr. 29, 1994.

[51] Int. Cl.$^6$ .................................................. G06F 15/18
[52] U.S. Cl. ................................ 706/59; 706/60; 706/46
[58] Field of Search ........................... 395/10–13, 50–51, 395/60–61, 76–77, 615; 705/10, 11, 45, 46, 52, 60, 59, 61

[56] References Cited

U.S. PATENT DOCUMENTS

| | | | |
|---|---|---|---|
| 4,649,515 | 3/1987 | Thompson et al. | 364/900 |
| 4,752,889 | 6/1988 | Rappaport et al. | 364/513 |
| 4,803,641 | 2/1989 | Hardy et al. | 364/513 |
| 4,803,642 | 2/1989 | Muranaga | 364/513 |
| 4,866,635 | 9/1989 | Kahn et al. | 364/513 |
| 4,884,217 | 11/1989 | Skeirik et al. | 364/513 |
| 4,891,766 | 1/1990 | Derr et al. | 364/513 |
| 4,916,633 | 4/1990 | Tychonievich et al. | 364/513 |
| 4,931,950 | 6/1990 | Isle et al. | 364/513 |
| 4,935,876 | 6/1990 | Hanatsuka | 364/513 |
| 4,967,368 | 10/1990 | Bolling et al. | 395/61 |
| 4,972,328 | 11/1990 | Wu et al. | 364/513 |
| 5,008,810 | 4/1991 | Kessel et al. | 364/200 |
| 5,107,497 | 4/1992 | Lirov et al. | 371/15.1 |
| 5,127,005 | 6/1992 | Oda et al. | 371/15.1 |
| 5,157,668 | 10/1992 | Buenzli, Jr. et al. | 371/15.1 |
| 5,208,745 | 5/1993 | Quentin et al. | 364/188 |
| 5,257,185 | 10/1993 | Farley et al. | 364/419.19 |
| 5,270,920 | 12/1993 | Pearse et al. | 364/401 |
| 5,295,230 | 3/1994 | Kung | 395/75 |
| 5,359,701 | 10/1994 | Fukui et al. | 395/62 |
| 5,506,937 | 4/1996 | Ford et al. | 395/12 |
| 5,615,112 | 3/1997 | Liu Sheng et al. | 395/615 |

OTHER PUBLICATIONS

Hekmatpour et al. "A Multimedia Expert System For Wafer Polisher Maintenance," IEEE, p. 453, Mar., 1993.

Hekmatpour et al., "Categorization–Based Diagnostic Problem Solving in the VLSI Design Domain," IEEE, pp. 121–127, Mar. 1993.

Hekmatpour et al., "Hierarchical Modeling of the VLSI Design Process," IEEE Expert, pp. 56–70, 1991.

Sharma et al., "On Measures of Useful Information," Issue 39, pp. 323–336, 1978.

Clancey, W. J., "Heuristic Classification," Artificial Intelligence, vol. 27, No. 3, pp. 289–350, 1985.

Borgida et al., "Hierarchical Knowledge Bases and Efficient Disjunctive Reasoning," Proc. of First Int. Conf., pp. 33–43, 1989.

(List continued on next page.)

*Primary Examiner*—Tariq R. Hafiz
*Attorney, Agent, or Firm*—Heslin & Rothenberg, P.C.

[57] ABSTRACT

An expert system and processing method employing a three level hierarchical knowledge base that has a plurality of nodes coupled together. An uppermost level comprises a behavioral knowledge level, a middle level comprises a structural knowledge level and a lowermost level is an action level. Inference processing proceeds from the behavioral knowledge level through the structural knowledge level to a leaf node of the action level. One or more non-inferentially assessable utilities may be associated with the inference kernel of the expert system for accessing during inferential processing within the hierarchically structured knowledge base. A knowledge editor implements guidelines that structure received information in the desired hierarchical three level configuration. Further, interactive multimedia/hypermedia systems and methods are presented, which might be expert system based. Training and certification applications of the multimedia/hypermedia system/method are given.

17 Claims, 27 Drawing Sheets

OTHER PUBLICATIONS

Bourne et al., "Organizing and Understanding Beliefs in Advice–Giving Diagnostic Systems," IEEE, vol. 3, No. 3, pp. 269–280, Sep. 1991.

Lee et al., "A Diagnostic Expert System Prototype for CIM," Computers ind. Engng, vol. 22, No. 3, pp. 337–352, 1992.

David, Randall, Retrospective on "Diagnostic Reasoning Based on Structure and Behavior," Artificiial Intelligence, vol. 59, No. 1–2, pp. 149–157, Feb. 1993.

IBM Publication, SAA CUA Guide to Multimedia User Interface Design, "System Application Architecture Common User Access Guide to Multimedia User Interface Design," Mar., 1992.

Paasch et al., "A Structural and Behavioral Reasoning System for Diagnosing Large–Scale Systems," IEEE Expert vol. 8, No. 4, pp. 31–36, Aug. 1993.

"Model–Based Reasoning in the KEE and SimKit System." IntelliNews, vol. 2, No. 2, Aug. 1986.

Kaplan, Randy, et al. "A Generalizable Architecture for Building Intelligent Tutoring Systems." IEEE Artificial Intelligence Applications Conference, Mar. 1993.

Shadbolt, Nigel. "Hypermedia for Knowledge Engineering." IEE Colloq. No. 142: Hypertext, Dec. 1990.

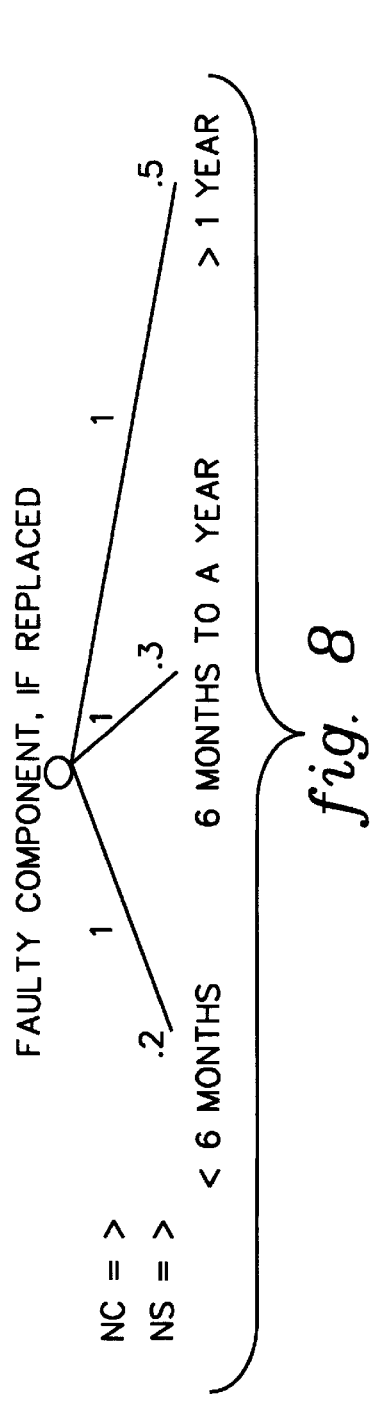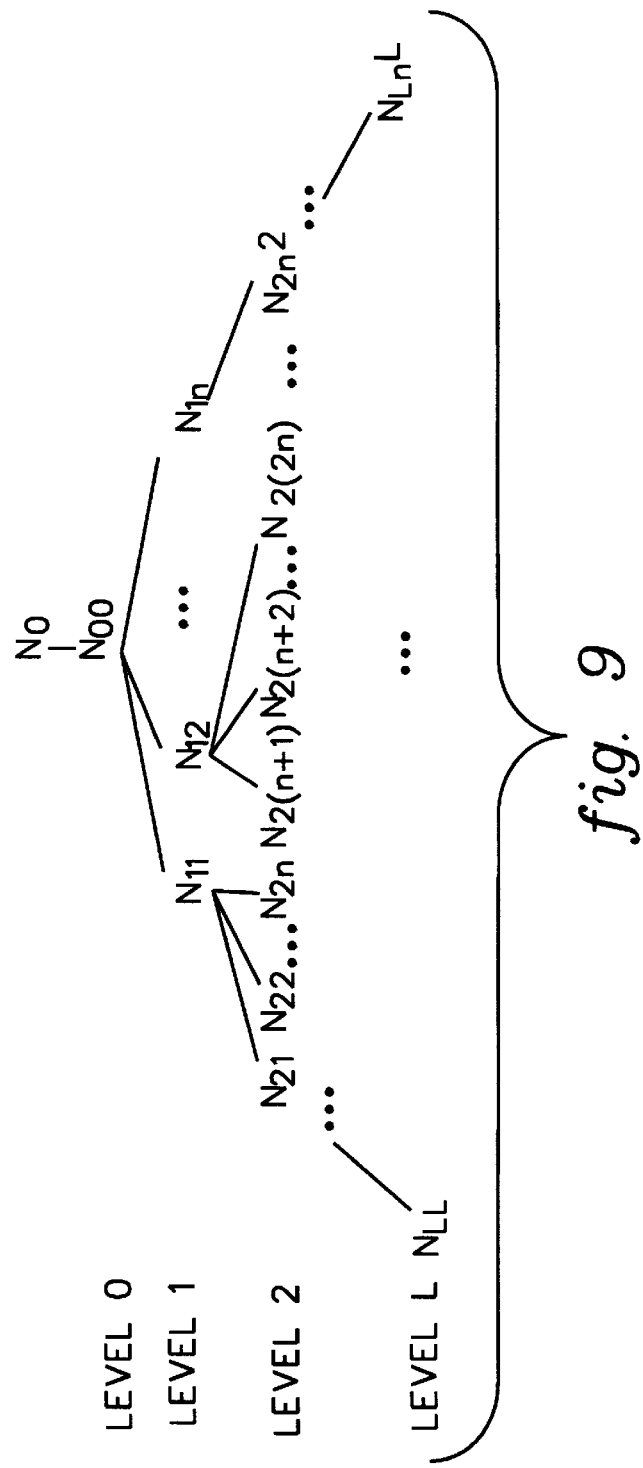

EXPERT SYSTEM AND METHOD EMPLOYING HIERARCHICAL KNOWLEDGE BASE, AND INTERACTIVE MULTIMEDIA/HYPERMEDIA APPLICATIONS

CROSS REFERENCE TO RELATED APPLICATIONS

This Application is a division of U.S. Pat. application Ser. No. 8/235,301 filed Apr. 29, 1994 which application is now pending.

TECHNICAL FIELD

The present invention relates in a first aspect to expert systems, and in particular, to a domain independent expert system and method employing inferential processing within a hierarchically-structured knowledge base and non-inferential accessing of information within one or more associated utilities. In another aspect, the invention relates to a unique hierarchical structure for representing information in a knowledge base for access by an inference kernel and to a knowledge editor for facilitating development of such a knowledge base by a domain expert. In still another aspect, the invention relates to interactive mutimedia/hypermedia systems and methods, particularly for training and certification applications.

BACKGROUND ART

CIM (computer-integrated manufacturing) is viewed as an emerging technology in the domain of manufacturing. The concept of CIM is that the whole performs better than the sum of the individual parts. In order to make a system run smoothly with minimum delay (i.e., continuous flow manufacturing) it is necessary to have a diagnostic system for discovering any cause of system failure. It is desirable that this diagnostic system be capable of performing its task as fast as possible since the duration of the system's down time is very closely related to productivity and cost. Thereby, there is a need for intelligent diagnostic systems. In artificial intelligence and expert systems, diagnosis has been given more attention in recent years, including trouble-shooting in electronic circuits and medical diagnosis.

There have been a variety of approaches taken by various researchers for creating intelligent diagnostic expert systems. These approaches range from shallow reasoning using compiled rules to model-based deep reasoning systems that reason by exploiting causal, structural, and functional relationships. Some approaches even combine shallow and deep knowledge reasoning. It has been hypothesized by some that the use of deep representations of entities to be diagnosed is superior to empirical knowledge about associations between malfunctioning parts of an entity and symptoms. The rationale for such a conclusion is that one could not exhuastively catalog all such associations, and without such a catalog, a heuristic-based diagnostic system becomes brittle and fails when presented with a case that it does not understand.

On the other hand, deep knowledge representation is based on models that are difficult to construct, especially models that exhibit the technology intent of the designer. Further, it is unlikely that models will mirror the future behavior of entities of any complexity, particularly with regard to providing information about multiple perspectives. Moreover, models are likely to be domain specific and only some fraction of knowledge will be transferable from one diagnostic system's knowledge base to another.

It is also recognized that rule-based systems become increasingly difficult to understand and maintain as the number of rules grow. While a reasonable rule-based expert system shell can assist a domain expert in formulating cause-and-effect rules, a collection of such rules typically will not function as an expert system, except for the most simple cases. To overcome these limitations, some expert system shells allow the encoding of strategic and object-level knowledge as meta-rules. However, this requires extensive knowledge of the programming paradigm and the development environment. Another class of tools provides a search algorithm for a flat problem-space representation. Although the problem representation is simplified, the search complexity for a problem of solution length L, and a search space branching factor B has a worst case complexity $O(B^L)$.

As an alternative, it has been suggested that it is actually more fruitful in certain domains to concentrate on constructing models of belief organization for diagnosis rather than models of physical entities. The concept of belief potentially has a wider scope than explicitly defined knowledge. A method of organization of beliefs has been proposed for diagnostic problems that provides explicit belief organization with implicit organization of knowledge about physical device characteristics, functionality, and behavior. The method is claimed to provide reasoning about belief among alternatives, is extensible, and can be scaled to problem size. Further, it is asserted that belief manipulation coupled with information about fault history, events, and symptoms is sufficient to secure a good diagnostic result. The approach presented herein modifies and combines behavioral knowledge presentation with structural knowledge presentation to identify a recommended action.

It has long been recognized that hierarchical problem solving can be used to reduce search space within an expert system. It has been shown that the complexity of search space for a problem of solution length 'L' and search space branching factor 'B', is reduced from $O(B^L)$ for single-level representation, to $O(\sqrt{L})\ B^{\sqrt{L}}$ for two-level representation, and to $O(L)$ for multi-level representation. This analysis is based on the assumption that the abstraction divides the problem into $O(L)$ constant size problems that can be solved in order, without backtracking. It can be shown that even in domains that do not satisfy the assumption, the use of hierarchical problem solving still produces significant reductions in search space. Hierarchical problem solving and knowledge processing techniques have been used in several reported expert systems. The concepts presented herein provide enhancements over such prior techniques.

Experienced engineers, technicians, and system operators typically develop their own diagnostic flowcharts, procedures and shortcuts over time. Such materials are utilized during daily activities, and only occasionally do such individuals refer to basic principles and documented diagnostic procedures to solve problems. This has been a natural response to the large volume of maintenance and operation manuals offered by tool vendors and process developers of a manufacturing enterprise. Further, the majority of expertise accumulated by technicians and operators is usually not shared among different teams and can be lost due to transfers or job changes. In addition, local upgrades/modifications, which might not be explained in a vendor manual, can be scattered among personal notebooks or other notes near the machines or technician workbenches. The challenge of knowledge engineering in such an environment is to accommodate various sources of expertise and to guide and influence the expert toward considering all aspects of the environment beyond the individual's usual activities and concerns.

The knowledge acquisition task is often complicated by the fact that human experts have not analyzed the contents of their thoughts, so that they are not explicitly aware of the structure of their knowledge. As a result, the intermediate steps and the reasoning seems obvious to them and they cannot clearly provide an overall account of how decisions are made, at least not at a level of detail required for expert system development. There are a number of approaches to knowledge acquisition. The three basic approaches are interview, interaction (supervised) and induction (unsupervised).

Historically, interview has been the most prevalent method of knowledge acquisition. It is, however, highly dependent on the knowledge engineer, is often time consuming and expensive, and is typically viewed as the knowledge acquisition bottleneck. It is also recognized that for knowledge intensive and task oriented applications, supervised knowledge acquisition is more efficient. Large database and data intensive applications are good candidates for unsupervised knowledge acquisition.

On the other hand, many expert systems use task-oriented shallow knowledge. In knowledge acquisition it is sometimes necessary to carry out excursions into deep knowledge in order to understand and validate associated shallow knowledge. This requires involving experts in knowledge acquisition, since they are in a position to understand the deep knowledge and its relation to the shallow knowledge. In addition, studies performed on the quality, efficiency, and accuracy of knowledge bases have shown that knowledge bases developed by the expert (versus the knowledge engineer) tend to be smaller, provide larger number of pathways associating evidence to diagnostic hypothesis, include more critical attributes, and provide richer clusters of knowledge. This is another argument in favor of providing domain experts with a larger role in knowledge acquisition.

As a related problem, existing multimedia training applications are typically developed by a media production specialist, and are usually delivered on read-only storage medium (CD-ROM, video disk). Such applications exhibit huge initial start-up costs, do not provide any intelligent feedback or control, and require specialized hardware and/or software, meaning that any modification and/or upgrade will be expensive and time consuming.

Manufacturing enterprises can employ hundreds and sometimes thousands of permanent and temporary system operators and technicians. Currently, a multitude of methods are used for educating and assisting such manufacturing personnel. These methods include informal, unstructured training sessions, printed 'in-house' manuals, classroom instruction, and walk-through orientations to name but a few. In the manufacturing environment, the student population grows with every group of new employees, whether temporary or permanent. This student group is typically large and decentralized and cannot be released from the manufacturing line simultaneously to attend a standardized training course.

Interactive multimedia training and certification can present consistent subject matter, on a flexible twenty-four hour, seven day per week schedule. The subject matter delivered to the trainee is guaranteed to be consistent, thus avoiding reliance on a thorough presentation of material by a knowledgeable technician. Use of an on-line computer based training methodology would eliminate a back-level problem. Currently, with the use of printed documents there is always an uncertainty as to whether the line operator is using the most current version or whether an operator's training in fact covers a latest version of a processor tool upgrade. By making the information available on-line, positive control over the information being disseminated is obtained.

Computer-based training and intelligent tutoring systems are typically based on a single, and rather simple user model. Regardless of the familiarity or lack of familiarity of the trainee with the topic, all trainees go through the same training process. A new employee who has never worked in a similar environment is given the same training material as an employee who has many years of related experience and might have been transferred to a new assignment from a similar area. Certification and qualification procedures are usually conducted orally in an ad-hoc fashion and are subject to a trainer's judgment and biases. In addition, there is no formal methodology for increasing the responsibility of a trainee as the training proceeds. In order for a computer-aided training system to acquire the necessary flexibility, it should distinguish between several types of students and structure the training material according to a student's needs and background.

Multimedia in general, and motion video, animation and audio in particular, are believed very appealing to personnel involved in maintenance, diagnostics and training applications. However, in many cases a major drawback is the cost and logistics of hardware and software required to implement such a multimedia system. This is complicated by the fact that most manufacturing facilities include tens if not hundreds of workstations. If an application requires special hardware and/or software licensing, then cost becomes significant.

All the above drawbacks and problems associated with existing expert systems and multimedia/hypermedia applications are addressed by the systems and methods presented herein.

Disclosure of Invention

Briefly described, the present invention comprises in a first aspect an expert system responsive to provided external information. The expert system includes a first storage means and a second storage means. The first storage means stores a hierarchically-structured knowledge base containing inferentially processable information, while the second storage means contains at least one utility comprising non-inferentially accessible information. A processor is coupled to the first storage means and the second storage means for processing the hierarchically-structured knowledge base and accessing the at least one utility, respectively. The processing means includes means for inferential processing of information in the hierarchically-structured knowledge base and means for non-inferential accessing of information in the at least one utility. The inferential processing means and the non-inferential accessing means are responsive to the provided external information.

In another aspect, the invention comprises a hierarchically-structured knowledge base for an expert system. The knowledge base comprises a hierarchical decomposition having a plurality of nodes coupled together in three distinct levels. An uppermost level comprises a behavioral knowledge level, a middle level comprises a structural knowledge level and a lowermost level is an action level. The action level is implemented as at least one decision tree. The three distinct levels are interconnected such that inference processing can occur through the hierarchically-structured knowledge base from the behavioral knowledge level through the structural knowledge level to the action level.

In yet another aspect, an intelligent system is presented responsive to provided external information. The system includes memory means for storing multimedia displayable information, which is non-inferentially accessible. An intelligent control system, coupled to the memory means, includes a hierarchically-structured knowledge base containing inferentially processable information and processing means coupled to the hierarchically-structured knowledge base. The processing means includes means for inferential processing of information in the hierarchically-structured knowledge base and means for non-inferential accessing of the multimedia displayable information in the memory means. The means for non-inferential accessing of multimedia displayable information is responsive to the means for inferential processing of information and the means for inferential processing of information is itself responsive to the provided external information.

In a further aspect, a computer system is provided having memory means for storing multimedia displayable information and display means for displaying information to a user of the computer system. A processing means, coupled to the memory means and the display means, includes hypergraphic processing capabilities associated with a predefined graphics image displayable on the display means. The hypergraphic processing capabilities include means for providing the user of the computer system with an options menu upon user selection of the predefined graphics image when displayed by the display means. The options menu has at least two user selectable options, each of which is linked to a separate portion of the multimedia displayable information stored in the memory means. Each separate portion of the multimedia displayable information presents information to the user in a different multimedia format.

In a still further aspect, a method for defining a hierarchically-structured knowledge base for an intelligent system is presented. The method includes the steps of: creating multiple knowledge trees from a plurality of nodes and associated attributes including at least one action knowledge tree, at least one structural knowledge tree, and a behavioral knowledge tree; and linking the knowledge trees together to form a hierarchical decomposition such that the hierarchically-structured knowledge base has three distinct levels, an uppermost level comprising the behavioral knowledge tree, a middle level comprising the at least one structural knowledge tree, and a lowermost level comprising the at least one action knowledge tree.

Also presented is a processing method for an expert system responsive to external information inputted by a user of the system. The processing method includes the steps of: inferentially processing information in a hierarchically-structured knowledge base interactively with the external information inputted by the user of the expert system; and during the inferential processing, non-inferentially accessing information in at least one predefined utility separate from the hierarchically-structured knowledge base. Additional methods and method enhancements are also provided herein.

To restate, provided herein is a domain independent expert system and processing method employing inferential processing within a hierarchically-structured knowledge base in conjunction with non-inferential accessing of information within one or more associated utilities. Knowledge representation architecture is based on hierarchical knowledge representation principles with a novel decision tree architecture consistent with a proposed knowledge engineering methodology. Conflict resolution employs an entropic based approach which allows domain experts to describe the heuristics practiced in resolving conflicts and unanticipated situations, taking into consideration the practicality and overall cost of the solution.

In a diagnostic implementation, knowledge processing provides useful information on the nature of a problem, even if the exact problem(s) remains unidentified. The knowledge engineering methodology is based on supervised knowledge acquisition principles and provides a complete knowledge engineering strategy directed towards a domain expert. Acquisition guidelines and a Knowledge Editor provide a novel integrated solution for reducing the knowledge engineering bottleneck, and improving the quality of the final system. Development and deployment of an interactive diagnostic expert system is possible on standard workstations, thereby providing a low cost delivery platform, as well as enabling the integration of multimedia capabilities of graphical workstations into the diagnostic applications.

Also presented is a complete and integrated methodology and architecture for development of intelligent interactive multimedia/hypermedia computer-aided training/education and qualification/certification applications. A control and management knowledge base serves as an intelligent tutoring system framework. Training, certification, and on-line documentation databases are integrated with the knowledge based control and management. Applications developed under this methodology and architecture reside entirely on hard disk or removable/rewritable storage medium (such as optical storage), and can be used in stand-alone or network configuration.

BRIEF DESCRIPTION OF DRAWINGS

These and other objects, advantages and features of the present invention will be more readily understood from the following detailed description of certain preferred embodiments of the invention, when considered in conjunction with the accompanying drawings in which:

FIGS. 1a, 1b & 1c are examples depicting the hierarchical data structure of a knowledge base in accordance with the present invention, wherein FIG. 1a depicts universal attributes, FIG. 1b shows global attributes and FIG. 1c is an example of a Condition Action Tree (CAT);

FIG. 8 depicts representation of events as time-stamped branches of corresponding condition action trees;

FIG. 9 is an example of a condition action tree (CAT) showing a root node, an entry node and various children nodes connected thereto;

BEST MODE FOR CARRYING OUT THE INVENTION

Figure 1A:
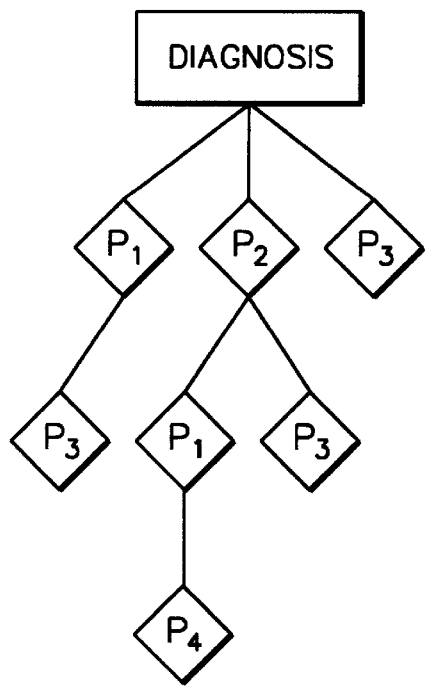

Various terms used herein will first be explained. "Diagnosis" is defined as inferring system malfunctions from observable elements, factors, or circumstances or identifying the proper association between symptoms and their causes. In other words, diagnosis is the process of finding the location and nature of a system malfunction and even suggesting a remedy. A "system" is defined as a complex of interacting objects that have some process behavior. The following are examples of systems: a VLSI chip; a computer program; a manufacturing tool or machine (e.g., wafer polisher, oxide growth furnace, etc.); a manufacturing group; and a human.

By way of example, a semiconductor manufacturing process will be discussed herein. In a semiconductor fabrication environment, a "malfunction" can be an error in a computer program, a defect in a VLSI chip, an incorrect specification of a manufacturing recipe, a failure of a manufacturing tool to function properly, etc. A "symptom" of a malfunction is observed when the system behaves in a way that is not expected. In other words, a symptom is a discrepancy between observed, or actual behavior, and an expected, or predicted system behavior. A symptom is an observable condition which indicates an abnormal behavior or a possible malfunction. Hence, when a symptom exists, there must be a condition (fault) which causes the symptom. A "condition" is an underlying, invisible, real problem. A symptom on the other hand, is a visible manifestation of one or more condition(s), i.e., evidence of a condition(s), such as a tool malfunction or a system error message. Diagnosis therefore means identifying the conditions after observing or indirectly detecting the symptoms. An "initiative" is an action or a set of actions necessary to recover from a malfunction, or a set of actions (operations) that will transform a system to a desired state.

As noted initially, experienced engineers, technicians, and operators usually develop their own diagnostic flowcharts, procedures, and shortcuts over the years. They utilize these during their daily activities and only occasionally refer to basic principles or documented diagnostic procedures to solve problems. This has been a natural response to the large volume of maintenance and operation manuals offered by tool vendors and process developers of a manufacturing enterprise. The majority of the expertise accumulated by technicians and operators is usually not shared among different teams and can be lost due to transfers or other job changes. In addition, local upgrades and modifications (which do not end up in the vendor manuals) can be scattered among personal notebooks, notes on the machines, and technicians' workbenches. The challenge of knowledge engineering in such an environment is to accommodate various sources of expertise and to guide and influence the expert toward considering all aspects of the environment, including those beyond the individual's activities and concerns. This is necessary for eliciting complete and accurate knowledge and associated reasoning strategies.

There are a number of approaches to knowledge acquisition. However, the three basic approaches are:

1) Interviewing;
2) Supervised interaction; and
3) Unsupervised induction.

Historically, interviewing has been the most prevalent method of knowledge acquisition. It is however highly dependent on the knowledge engineer, and is often time consuming and expensive. It is also recognized that for knowledge-intensive and task-oriented applications, knowledge acquisition by supervised induction is more efficient than interviewing or unsupervised induction. Large database and data-intensive applications are good candidates for unsupervised knowledge acquisition.

The construction of a knowledge base is currently a bottleneck in the development of AI systems. This is because it usually involves interviews with an expert, analysis of the interview records and protocols, and then formulation of the decision rules. Thus, the knowledge acquisition problem is time-consuming and does not always guarantee the validity of the rules obtained. An important method to overcome these problems is to employ inductive learning from examples. With this approach, the expert is asked to provide good examples and counter examples of decisions, rather than to formalize his knowledge in terms of decision rules. These examples are then processed by the knowledge engineer or by a computer to produce decision rules.

The knowledge acquisition task is often complicated by the fact that human experts have not analyzed the contents of their thoughts, so they are not explicitly aware of the structure of their knowledge. As a result, the intermediate steps in their reasoning seem obvious to them but they cannot clearly provide an overall account of how their decisions are made, at least not at the level of detail required for expert system development.

On the other hand, many expert systems typically use task-oriented shallow knowledge. Notwithstanding this, in knowledge acquisition it is sometimes necessary to carry out excursions into deep knowledge in order to understand and validate the associated shallow knowledge. This traditionally requires involving experts in knowledge acquisition, since they are in a position to understand the deep knowledge and its relation to shallow knowledge. In addition, studies performed on the quality, efficiency, and accuracy of knowledge bases have shown that knowledge bases developed by a domain expert (rather than by a knowledge engineer) tend to be smaller, provide a larger number of pathways linking evidence to diagnostic hypothesis, include more critical attributes, and provide richer clusters of knowledge. This is another argument in favor of providing experts with a larger role in knowledge acquisition.

Considering the above difficulties, the nature of applications targeted by the present methodology, and an overall goal of enabling the domain expert to develop the diagnostic application, a supervised knowledge acquisition methodology geared toward domain experts is proposed herein. This methodology is comprised of two stages, namely:

A) Compile, organize, partition, and document the knowledge and associated reasoning processes according to predefined guidelines (explained below); and B) Use the Knowledge Editor software tool (presented below) for knowledge entry and verification.

The two stages of the present approach are accomplished in four steps. The first step is educating and familiarizing the potential user with the capabilities and limitations of the knowledge-based system (KBS) and multimedia technology (discussed below). This step includes establishing a two-way communication channel. In the second step, the user environment is analyzed to identify the potential areas and tasks suitable for KBS implementation. In the third step, basic principles of developing and utilizing the KBS and multimedia technology pertaining to users' domains are described and documented as a set of easy-to-follow guidelines and procedures. These guidelines and procedures are focused on problem identification, partitioning, organization, and documentation, and are considered an integral part of the architecture. They provide a supervised knowledge acquisition methodology consistent with the proposed knowledge representation and diagnostic reasoning architecture in accordance with the present invention. And finally, the user is gradually encouraged to take on more and more responsibility for development and maintenance of the expert system. Each of these steps is described in detail below.

System development begins by meeting with the technicians, operators, and managers responsible for the tool, process, or task being considered for expert system implementation. Each group is asked to list what they perceive to be the problems, time consuming tasks, and shortcomings of their interaction and involvement with the tool or process, and why they perceive each to be a problem, shortcoming, or waste of time.

The above groups are then asked to explain how they presently handle and manage the described problems. To gain insight into the nature of the problem(s) and to help explain all aspects of the problem(s) and the environment, the following questions can serve as an outline for the discussion:

What are the short cuts?

How often do they deal with these problems?

How they would like to handle the problem? (provide a wish list)

How would they change their work environment if they had the necessary resources?

Why would they make such changes and modifications?

What is the return on investment for their organization?

What is the effect of changes on the product quality, cost, and turn-around-time?

The next step is to follow the technicians or operators for a few hours a day, for a few days, and just watch them do their jobs. This is very helpful in understanding the complexity and logistics of their jobs and the different sources of data they need to access. Many cases involve a lot of walking around the manufacturing floor to review manuals, to check the maintenance log, or to consult with other technicians for help and suggestions. In some cases maintenance logs have to be checked to determine the last time a component was changed, a specific service performed on a tool, or a process was modified.

The next step is to closely observe the experts as they perform diagnosis. They should be asked to explain and talk about what they are doing as they go through the diagnosis. This involves giving the expert a problem to solve and letting him/her talk out loud as the problem is solved. The expert may not feel comfortable with this process at first, but it can be explained that you just want to learn how a problem is approached, and that will enable you to understand their style and capture their expertise. As the individual continues with the diagnosis, their comments, explanations, and justifications should be documented. Comments such as "I am going to check the vacuum pressure," "I just want to make sure there is no vacuum before I test the vacuum switch," "I'd better turn off the main valve before I check the water filter," or "I have to be careful when checking these connections—they are high voltage" are very helpful in capturing the structure of the expert's troubleshooting methodology, diagnostic knowledge, and reasoning process.

The following guidelines and procedures, in conjunction with the Knowledge Editor, serve to induce and capture complete and accurate knowledge of the reasoning strategy, and the heuristics involved in the process. These guidelines cover three important aspects of knowledge engineering: knowledge identification, documentation, and refinement. In particular, guidelines 1–9 deal with identifying various knowledge modules and the relationships among these modules. Guidelines 10–19 address efficient and complete documentation of knowledge, while guidelines 20–27 concern refining the knowledge identified and documented in the previous two stages for mapping to the representation architecture and inference algorithm suitable for interactive diagnosis in accordance with the present invention. There are several techniques available to knowledge engineers for improving validation and verification. Articles in the available literature discuss exhaustive testing, case-based testing, formal specification, functional programming, critical testing, mutation testing, and reliability. Finally, the knowledge validation methodology described in steps 28–30 is a combination of exhaustive, case-based, and critical testing methods.

Identify Knowledge Modules

Figure 1B:
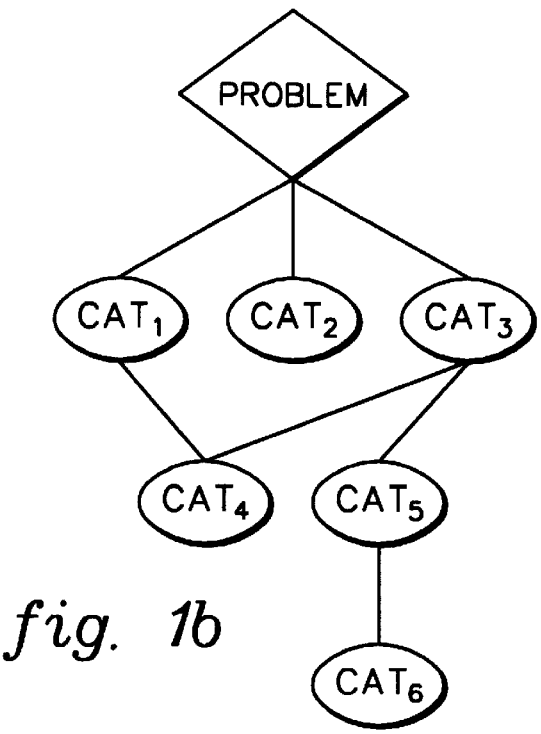

1) Identify and list all tasks involved.
2) Identify and list all sub-tasks in each task. Tasks should be partitioned at a point where either there is a pause in the scenario or the nature of the procedure changes. In addition, try to identify meaningful partitioning criteria related to the task, tool, or the environment.
3) List features common to all tasks and sub-tasks (Universal attributes) (FIG. 1a).
4) List unique features of each task and sub-task (Global attributes).
5) List all different ways a task or sub-task can be identified, scheduled, or performed.
6) List all known causes of or reasons for a task or a sub-task.
7) Make an ordered list of the steps involved in each task and sub-task.
8) If a sub-task includes more than 20 steps, see if it can be partitioned.
9) Generate a high level flowchart of the tasks and sub-tasks (FIG. 1b).

Document Knowledge Modules

Figure 1C:
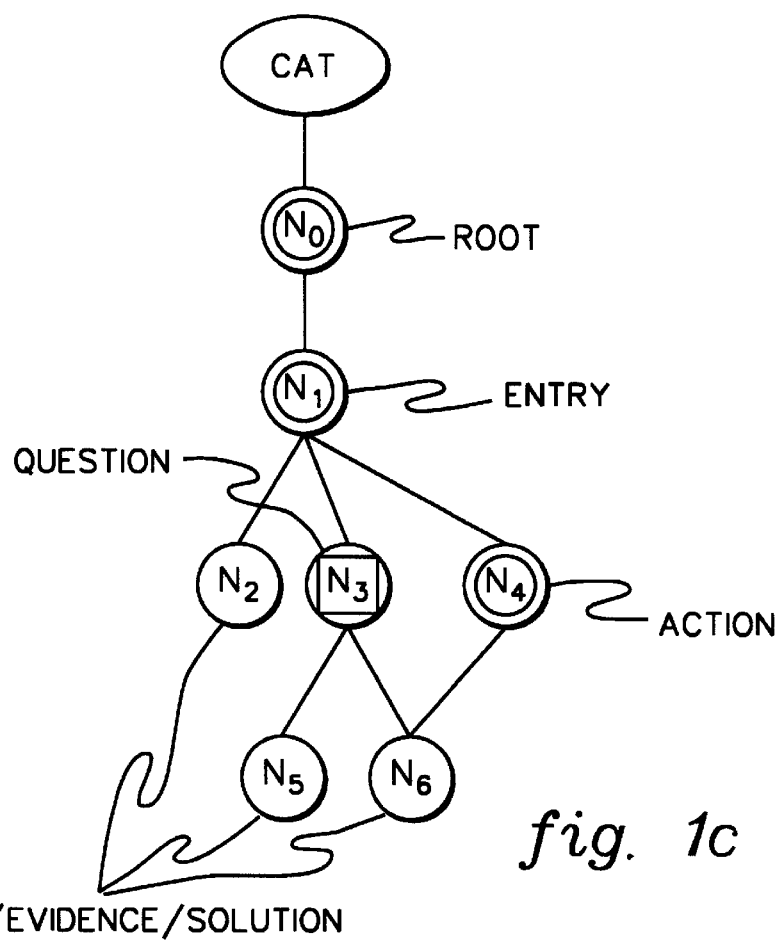
Figure 2A:
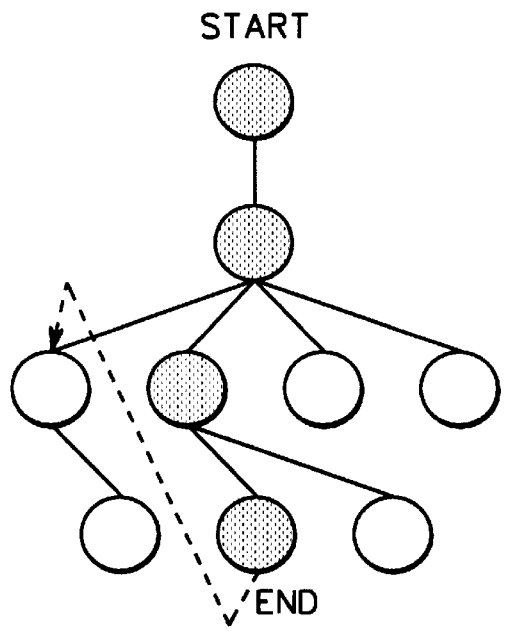
FIGS. 2a, 2b & 2c depict examples of diagnosis pursuant to the present invention using various condition action trees.
Figure 2B:
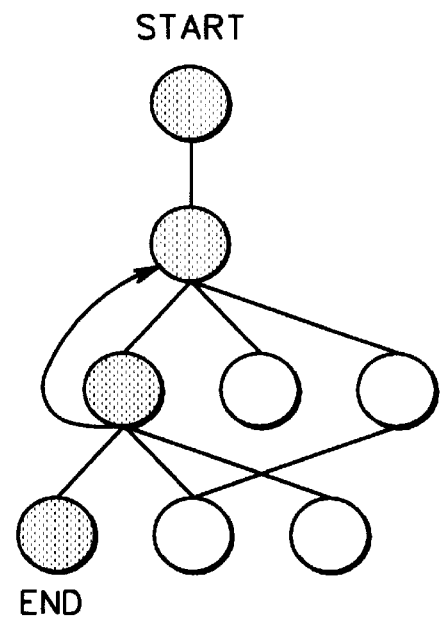
Figure 2C:
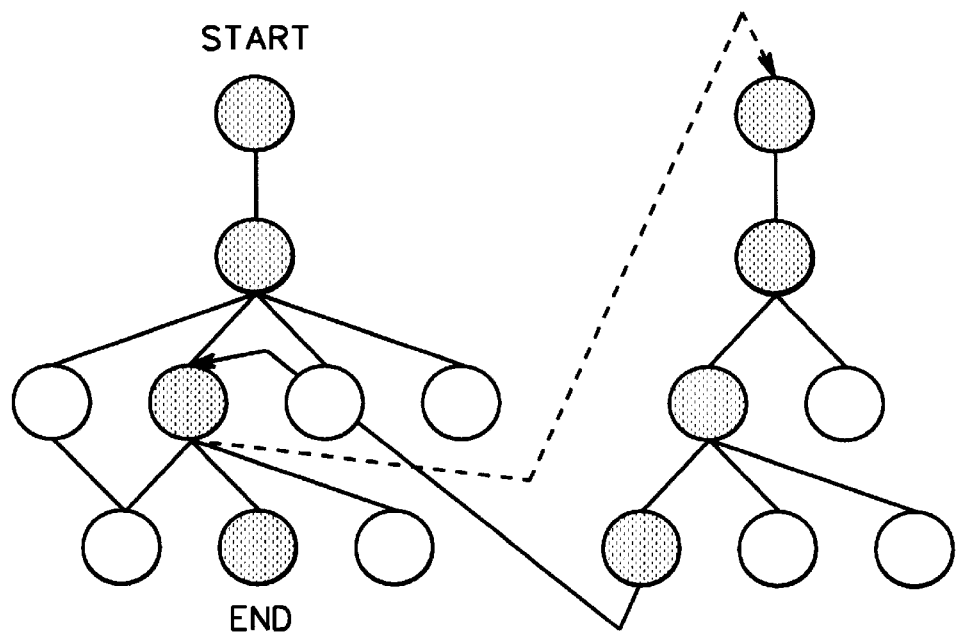

10) Generate a Condition Action Tree (CAT) (discussed below) for each sub-task (FIG. 1c). Use solid arcs to represent strong links and dotted arcs for weak links (FIGS. 2a–2c). Weak links can represent "maybe," "possible," "something to keep an eye on," or "the last recourse, in case all other options fail."
11) Name the root node of each CAT according to the problem which it represents. The root node is where all universal and global attributes are defined. These attributes are valid throughout the diagnosis (universal) or throughout a problem (global). Local attributes (valid for a node) are defined at the individual nodes. In addition, all initial preparations and checkings are done at the root. The root node leads to a single node (entry node), as shown in FIG. 1c. This is the beginning of a task or a sub-task CAT. If there is recursion in the process, it returns to this node, not the root node (see FIGS. 2a–2c).
12) Name each sub-task after its parent task. For example, if the task is "robotic arm movement problems," then sub-tasks could be "arm does not move up," "arm does not move clockwise," "arm does not move counter clockwise," "arm does not stop," etc.
13) Complete and expand the CAT by writing down the condition(s) to be tested at each node, the question(s) to be asked, the action(s) to be performed, and service(s) to be provided. Each node represents a decision, an inspection, an action, or a measurement.
14) Give each node a meaningful name which indicates the actions carried out at that node. For example, "is_vacuum_ok?," or "chk_house_air_pressure." This will facilitate knowledge base development and verification.
15) Write comments, extra instructions, warnings, things to look for, exceptions, etc., outside of the node.
16) On arcs connecting a node to its children nodes, write down the condition under which the branch is valid (e.g. Yes, No, >100, <=Max Spec Limit, etc.). These correspond to possible responses to the questions being asked or measurements made, etc.
17) Assign a node strength (NS) to each node, representing your belief that the node would be the proper diagnosis (option, symptom) for the parent node. Let $\Sigma NS=1$ for all children of a node.
18) Assign a node cost (NC) to each node, representing the relative cost (dollar, time, manpower, resources) of performing, testing, or verifying the conditions, tests, and actions described at the node ($0 \leq NC \leq 1$).
19) For each node, determine the most useful and meaningful order for sorting and presenting all its children nodes. (Node Rank, NR=1,2,3, . . . , 99.)

Refine Knowledge Modules

20) Identify the source of answers or data for each node. Should the user be prompted for the answer, should the data be extracted from a file, or should a database be queried?
21) Can the value of a node attribute change during diagnosis or is it fixed once assigned? For example, if "tool_id" is fixed, there is no need to ask for its value every time it is encountered during the diagnosis. Whereas, "pressure," "temperature," or "voltage" can change and, therefore, the most recent values should be obtained each time encountered during the diagnosis.
22) What type of data should be expected for a question (character, integer, real)?
23) How should the question be presented to the user? Should the user be presented with the question and an ordered list of possible answers to select from? Should the user be presented with a free format data entry panel? Should the user be told what is the valid range or type of answer?
24) Clarify the questions, actions, and measurements associated with each node in more detail, so a person not familiar with the environment can understand (WHAT). These textual descriptions will be available to users as an explanation or clarification of prompts and system dialogues.
25) Describe the reasons, importance, and relevance of each node to its parent node (WHY). Whenever the user requests an explanation of and reason for an action recommended by the system, the system will present the information associated with the current node's WHY attribute.
26) Compile a list of services required at each step during the diagnosis (e.g., display images, play audio or animation, show slide show, present textual or graphics information, etc.).
27) Enter the data compiled in previous steps via the Knowledge Editor. First define nodes, then CATs, then problems, and finally the system behavior and the problem hierarchy. Assign user prompt, WHAT, WHY, NS, NC, NR, global and universal attributes, input source(s), and services (e.g., show pictures, play video, motion or animation, generate and present charts, etc.) for all nodes.

Knowledge Verification

28) Verify the knowledge bases and export to a general purpose classification or decision network expert system shell. Knowledge modules are checked for syntax violations, conflicts, and clashes via a Knowledge Editor verification utility, discussed below.
29) Simulate the application one task at a time. If a problem is discovered, repeat the above steps, export, and simulate to verify. The diagnostic application and the knowledge bases can be evaluated through offline simulation and interactive simulation. In the offline simulation, the diagnostic episodes are randomly generated and entered into the system in the batch mode. The output is either evaluated manually or stored in a database for analysis. In the interactive mode, the knowledge engineer, the end-users and the experts run sample diagnostic cases and evaluate the system recommendations for accuracy and completeness. The interactive simulation should also include new users performing a set of diagnostic scenarios both the traditional way (referring to manuals, calling experts or maintenance technicians, etc.) and using the developed system, and then comparing the two approaches.

30) Finally, simulate the entire process and field test the application. Field testing the system should also be viewed as a stage in the system verification and testing. A typical system will be in field test mode for several months before becoming an integral part of a manufacturing process.

Figure 4:
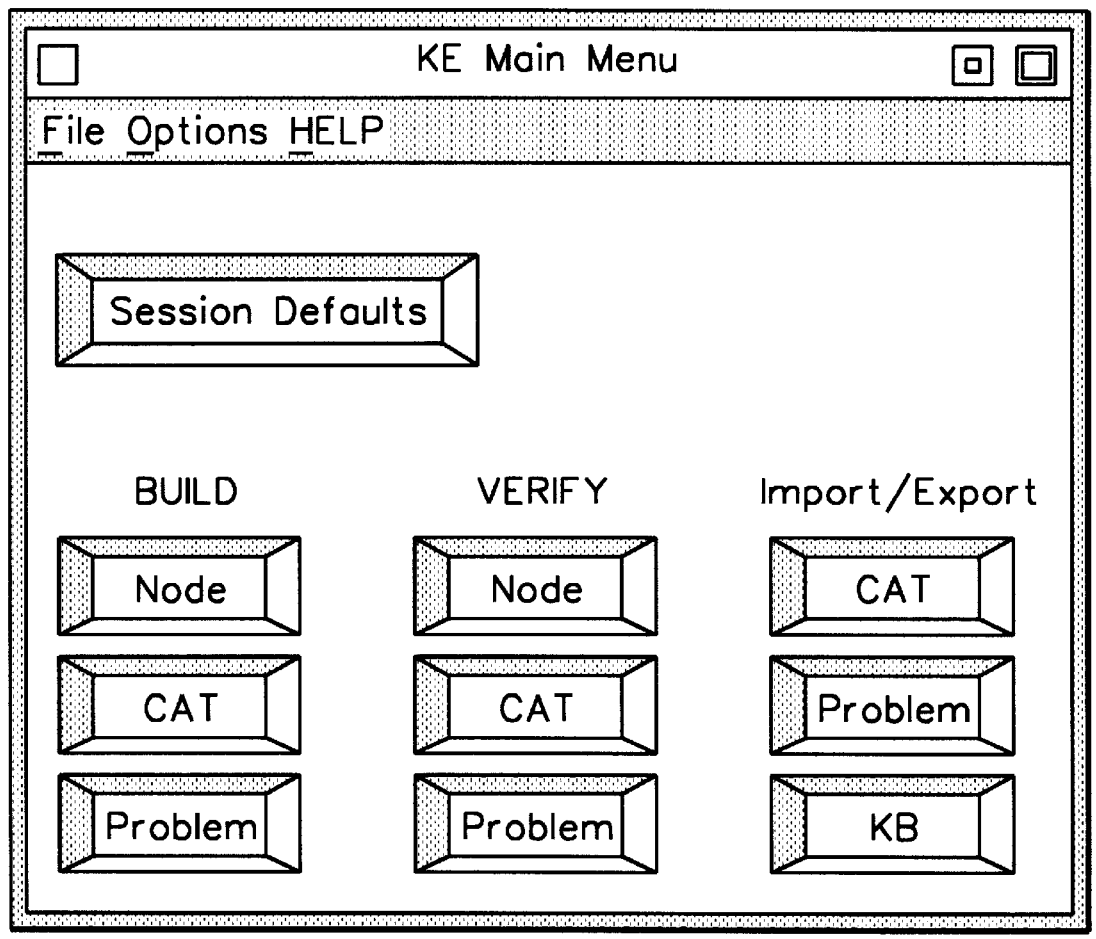
FIG. 4 depicts one embodiment of a main menu screen of a Knowledge Editor (KE) developed in accordance with the present invention to guide a user in partitioning and defining a diagnostic knowledge base.
Figure 5:
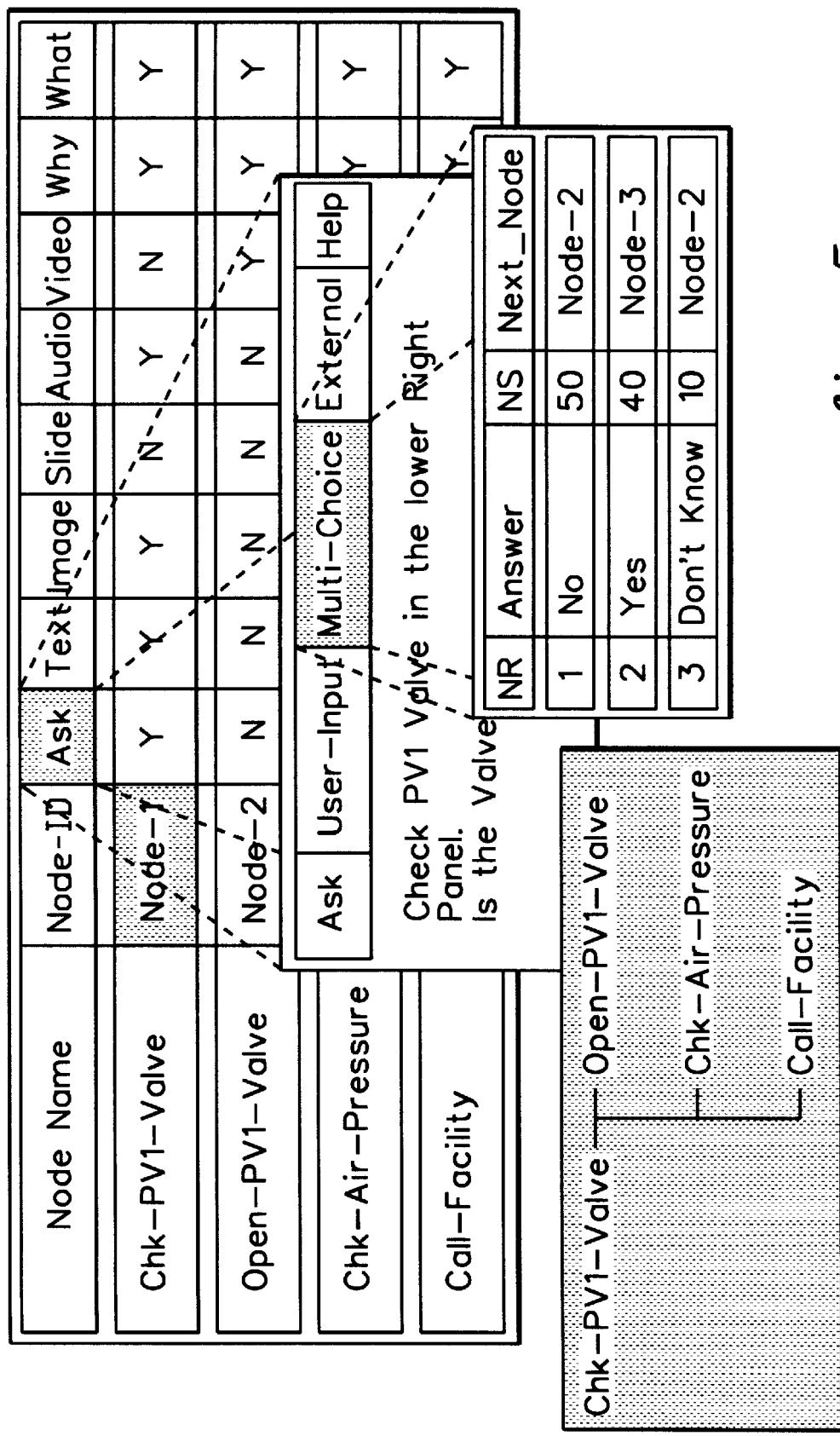
FIG. 5 is an example of a Knowledge Editor screen facilitating the definition of nodes and their attributes, and how nodes may be linked together to define a system in accordance with the present invention, wherein both template-based and visual programming capabilities of the KE are shown.

To enforce the above-described guidelines and to facilitate compiling and developing knowledge bases, a Knowledge Editor is provided in accordance with the present invention. The Knowledge Editor (KE) is developed in a suitable environment (e.g., IBM's OS/2 operating system) and guides the user in partitioning and defining diagnostic knowledge (FIG. 4). It provides panels for the user to define nodes and all the corresponding attributes (questions, instructions, actions, services, NS, NC, NR). CATs are defined by linking nodes (see FIG. 5), and then combined to define problems, and finally problems are linked to define the knowledge base. The Knowledge Editor performs verification and syntax checks.

Figure 3:
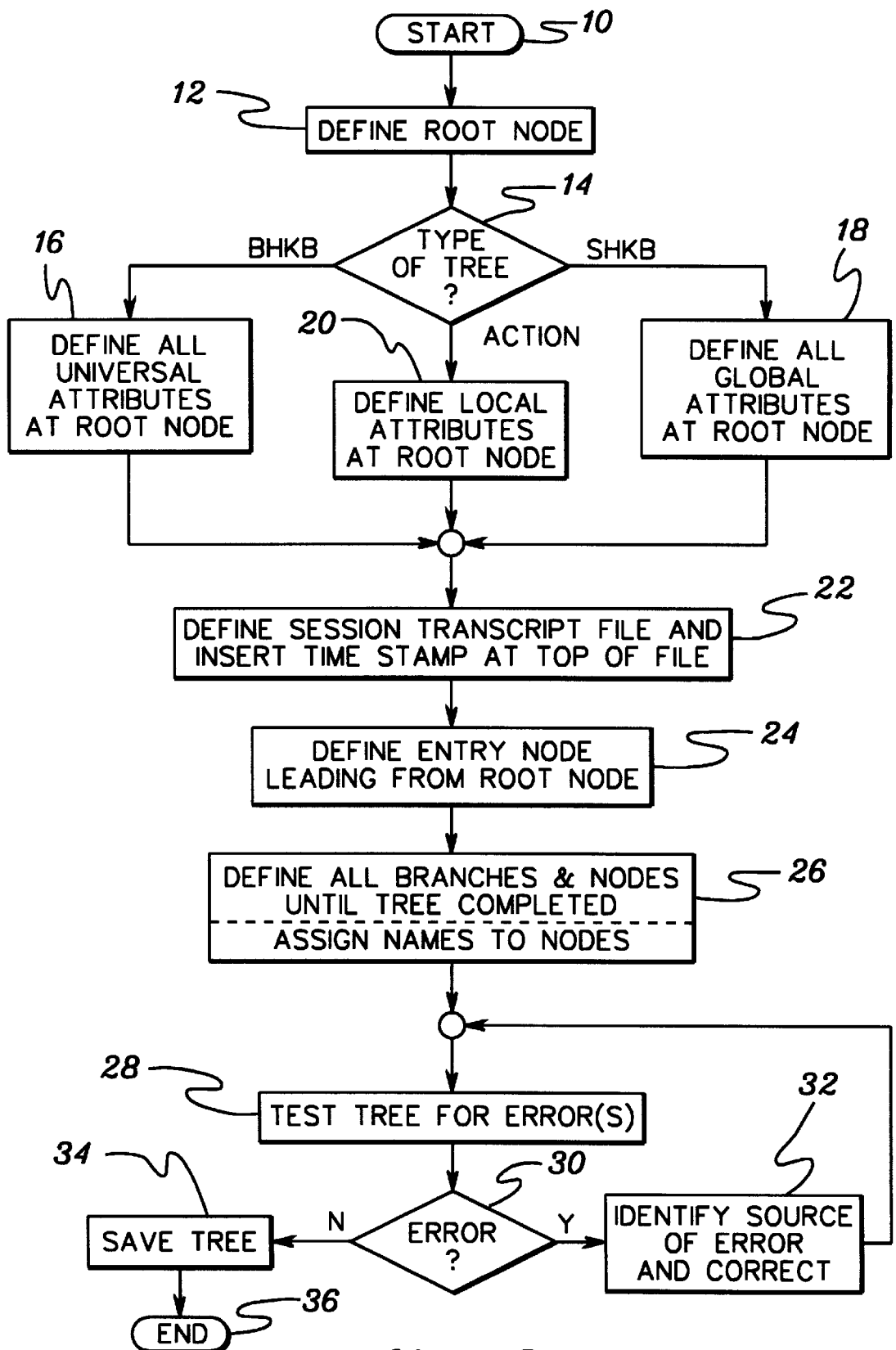
FIG. 3 is one processing embodiment for defining a knowledge tree (BHKB, SHKB, CAT) in accordance with the present invention.

One processing embodiment employing a Knowledge Editor in accordance with the present invention is set forth in FIG. 3. Initially, 10 "Start," a hierarchical tree structure is begun with definition of a root node, 12 "Define Root Node." The type of tree to be defined is then determined, 14 "Type Of Tree?" If at the behavioral level (BHKB), then all universal attributes of the knowledge base are defined, 16 "Define All Universal Attributes At Root Node," while at the structural level (SHKB) global attributes are defined, 18 "Define All Global Attributes At Root Node." Otherwise, a Condition Action Tree is defined, 20 "Define Local Attributes At Root Node." Once the type of tree is established, and attributes have been assigned to nodes, then a session transcript file is defined and a time stamp is inserted at the top of the file, 22 "Define Session Transcript File And Insert Time Stamp At Top Of File."

Next, an entry node leading from the root node is defined, 24 "Define Entry Node Leading From Root Node." This is followed by definition of all branches and nodes until the tree is complete, 26 "Define All Branches And Nodes Until Tree Is Completed; Assign Names To Nodes." Preferably, each node is assigned a meaningful node name and a short node ID. The resultant hierarchical tree structure is then tested for error, 28 "Test Tree For Error(s)," which is accompanied by error monitoring, 30 "Error?" If error does occur, the source of the error is identified and corrected, 32 "Identify Source Of Error And Correct." Once testing fails to establish the existence of an error, the resultant tree is saved in memory, 34 "Save Tree," and processing terminates, 36 "End."

The Knowledge Editor (KE) provides graphical as well as template-based knowledge entry. Graphical knowledge entry (shown in the lower left corner of FIG. 5) provides a visual programming environment for defining knowledge bases. The template-based approach (shown in the upper right corner of FIG. 5) might be more suitable for developers with a mainframe background who feel more comfortable with text-based application development environments. Graphical knowledge entry, on the other hand, is suitable for users who are familiar with graphical workstations and feel comfortable with using a mouse. In either case, the KE preferably provides a seamless interface and enables an application developer to move back and forth between these two development environments.

As briefly noted, there have been a variety of approaches taken by various researchers to attempt to understand methods for creating intelligent diagnostic systems. These range from rule-based ("shallow") systems consisting of IF-THEN production rules that are highly domain-specific, to model-based ("deep") systems that reason by exploiting causal, structural, and functional relationships. Diagnosis in shallow systems is fast if the symptom has been experienced and thus has been included in the knowledge base. Systems based on deep reasoning are slower but more flexible compared to shallow systems.

Some researchers have even combined shallow and deep knowledge reasoning. It is hypothesized by some that using "deep" representations of entities to be diagnosed is superior to using empirical knowledge about associations between malfunctioning parts of an entity and symptoms. The rationale is that one cannot exhaustively catalog all such associations; and without such a catalog, a heuristic-based diagnostic system becomes brittle and fails when presented with a case that it does not understand. On the other hand, deep knowledge representation is based on models that are difficult to construct—especially models that exhibit the technological intent of the designer. Further, it is unlikely that models will mirror the failure behavior of entities of any complexity, particularly with regard to providing information about multiple perspectives. Moreover, models are likely to be domain-specific, and only some fraction of knowledge will be transferable from one diagnostic system's knowledge base to another.

It is also recognized that rule-based systems become increasingly difficult to understand and maintain as the number of rules grow. While a reasonable rule-based expert system shell can assist a domain expert in formulating cause-and-effect rules, a collection of such rules typically will not function as an expert system, except in the most simple cases. To overcome these limitations, some expert system shells allow the encoding of strategic and object-level knowledge as meta-rules. This, however, requires extensive knowledge of the programming paradigm and the development environment. Another class of tools provides a search algorithm for a flat problem-space representation. Although the problem representation is simplified, the search complexity for a problem of solution length L and search space branching factor of B has worst-case complexity $O(B^L)$. Given the above arguments, what is the solution?

It is proposed that in diagnosis it is actually more fruitful in certain domains to concentrate on constructing models of belief organization rather than models of physical entities. The concept of belief potentially has a wider scope than explicitly defined knowledge. Belief descriptions are usually generalizable and flexible in application, whereas explicitly defined knowledge has limited scope and is very brittle.

Figure 6:
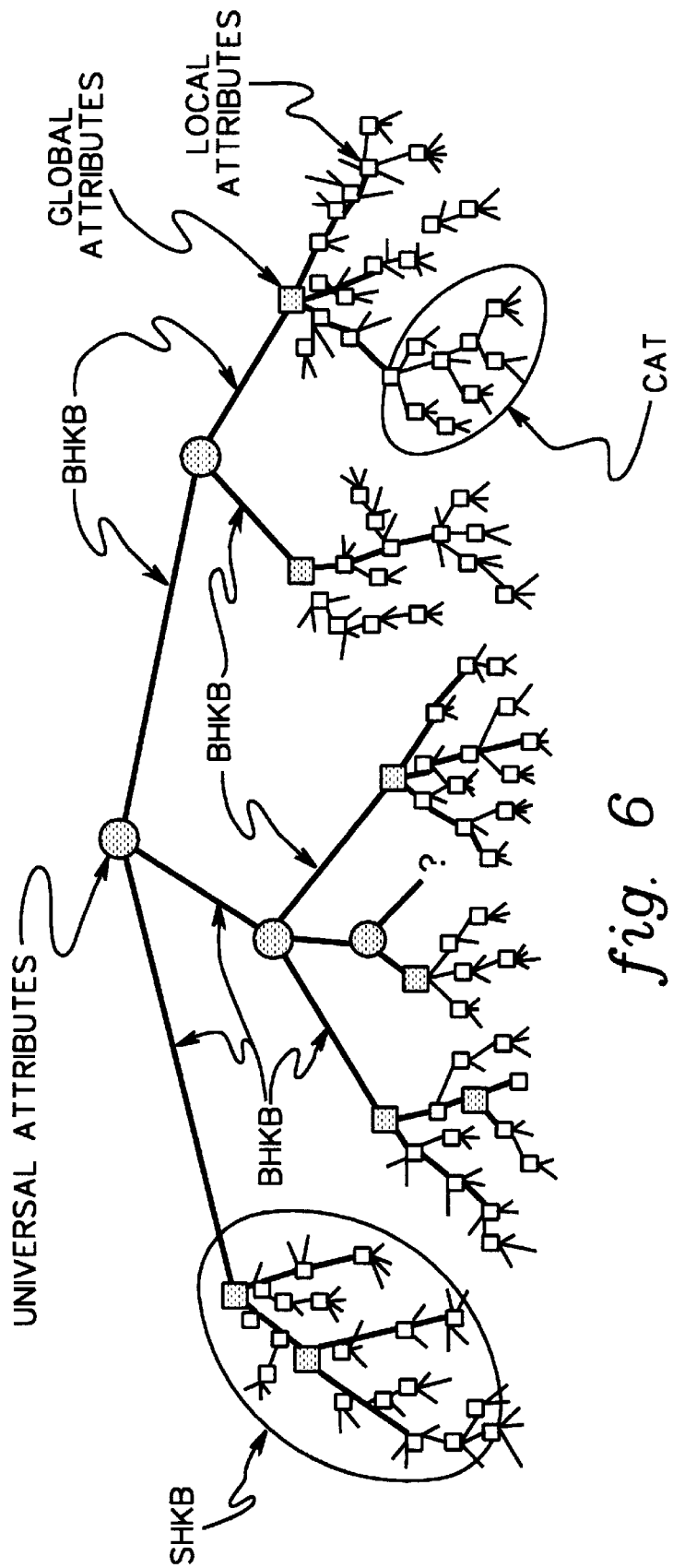
FIG. 6 is an example of a knowledge representation hierarchy pursuant to the present invention.
Figure 7:
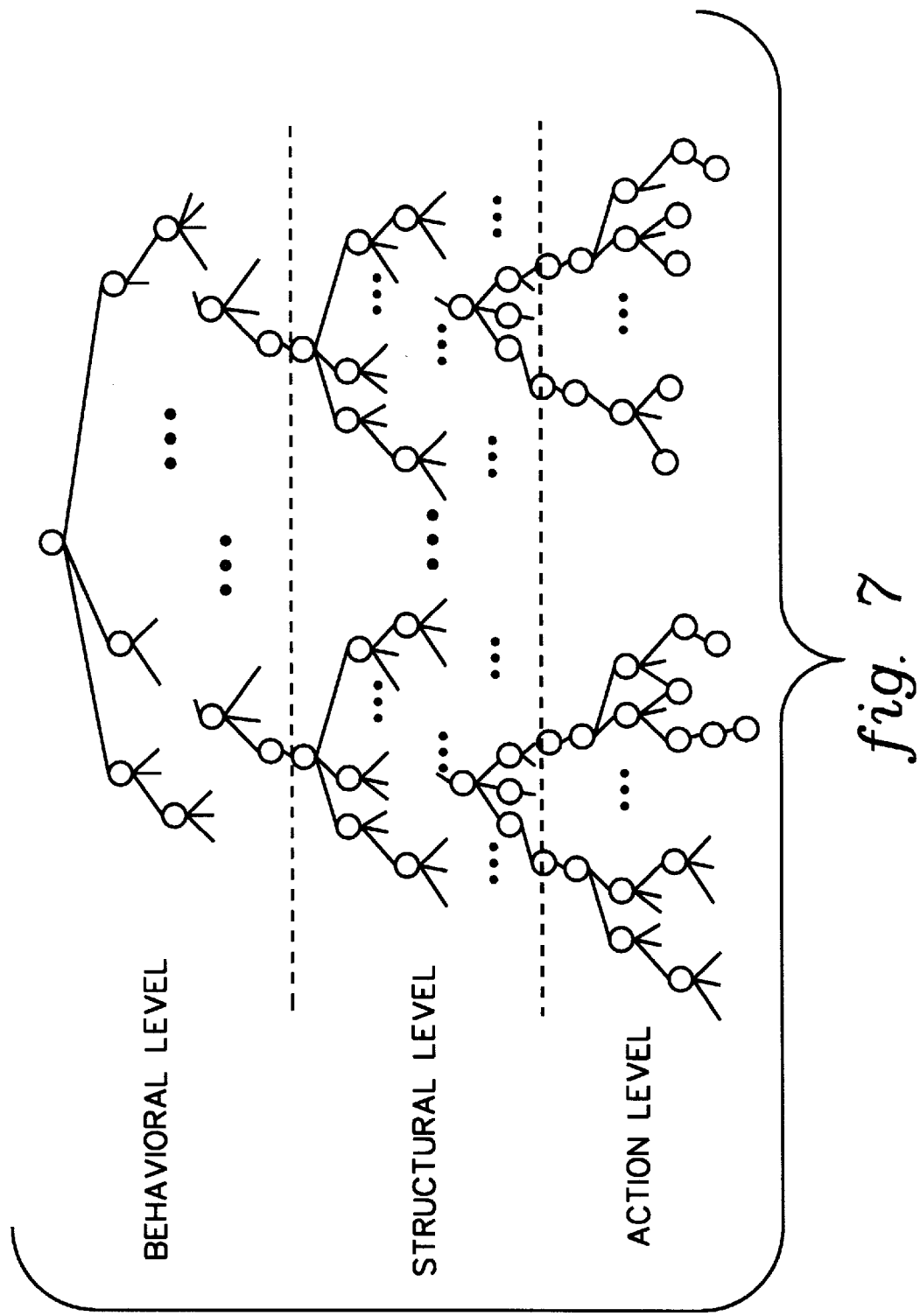
FIG. 7 is another example of a three level hierarchy in accordance with the invention, wherein structural level knowledge bases are linked to terminal nodes of a behavioral level knowledge base, and condition action trees are linked to the terminal nodes of the structural level.

In an approach in accordance with the present invention, the domain expert's knowledge about the behavior of the environment and the general information processing tasks are represented as a Behavioral Hierarchy Knowledge Base (BHKB) (see FIG. 6). Next, a number of knowledge bases representing the expert's knowledge about the physical and structural hierarchy of the environment and the specific information processing tasks, called Structural Hierarchy Knowledge Bases (SHKB), are linked to each terminal node of BHKB. Finally, the expert's knowledge about the association between symptoms, causes, functional characteristics of the environment, possible remedies, and the execution of various specific tasks and procedures are represented as branches of the SHKB, implemented as Condition Action Trees (CATs), as shown in FIG. 7.

Preferably, collective understanding about the diagnosis of a given fault is represented in a hierarchical fashion. Representation of knowledge as a hierarchy of networks, rather than by rules or models, has a three-fold advantage. First of all, system performance and incremental expansion is improved by eliminating the rule-base maintenance and rule interference problems. Second, such hierarchical decomposition provides access to intermediate states and thereby reduces the search space. Third, such knowledge representation is consistent with the expert's mental model of the environment and the reasoning process. Thus, overall development and maintenance effort is improved, as well as the predictability of the system behavior, independent of the amount of knowledge added into the system.

A knowledge representation architecture in accordance with the present invention is composed of three levels, hierarchically ordered according to the principles of "increasing precision with decreasing intelligence," namely: the abstract behavioral level, performing general information processing tasks; the structural level, dealing with specific information processing tasks; and the action level, executing various specific tasks.

A single knowledge base, called Behavioral Hierarchy Knowledge Base (BHKB), represents the high level abstraction of the problem space. The BHKB is in fact a behavioral representation of the concepts and hypotheses associated with the problem space. A number of knowledge bases representing the structural hierarchy of the problem domain knowledge are linked to each of the terminal nodes of the BHKB. These Structural Hierarchy Knowledge Bases (SHKB) represent more specific knowledge (hypotheses) about the environment and can be viewed as the structure of the problem domain and lower level problem resolution methodology. BHKB, on the other hand, are generated by analogies drawn across domains and applications, apply to a wider class of problems, and depict abstract problem solving strategies. Each SHKB represents a tool, process, process control, procedure, logistic, or service. Finally, there is the action level, which performs various specific tasks. The diagnostic actions at this level are implemented as CATs.

Note that diagnostic knowledge in accordance with the present invention is represented and processed as deep knowledge first (BHKB), then shallow knowledge (SHKB and CAT). The set of CATs associated with each terminal node of SHKB represents explicit knowledge at the lowest abstraction level. Such knowledge usually deals with the functional characteristics of the diagnostic process and the environment (tool characteristics, fault isolation, component testing, applying a specific remedy, etc.). The tri-level, hierarchical partitioning and representation of the diagnostic knowledge (BHKB, SHKB, or CAT), shown in FIG. 7, enables a user to add or delete problems (SHKB), procedures (CAT), and/or specific instructions (nodes) easily, without much effect on the system. In addition, it permits interactive diagnosis at three levels of abstraction. Thus, as an interactive diagnostic session progresses, abstract and vague dialogue is replaced with explicit and often exact interaction.

This knowledge representation does not treat time-related situations (events) differently. Events are simply represented as time-stamped branches of their corresponding CATs, as shown in FIG. 8. The knowledge representation does not include specific information on the actual date the event might have happened, but rather how such an event should be taken into consideration in the diagnostic process. For example, the recent replacement of a faulty component with a good part should decrease the belief that the part is at fault. This is a part of the knowledge base, but whether the part has actually been replaced is not a part of the knowledge base. Such information may reside in tool history logs or maintenance databases which could be queried by the knowledge base. In some cases, the diagnostic system may ask the user to verify whether an action has taken place, and if the answer is yes, to identify and verify the date of the action.

A Condition Action Tree (CAT) is an "n-ary" directed, acyclic, graph with a root $N_o$ and entry nodes $N_{oo}$, and L levels, each level having $n^L$ nodes. Each node (except a leaf node) has n children nodes, as shown in FIG. 9. Here it is assumed that each node has the same number of children (n), but in reality (n) is the maximum number of children a node can have. A node may have more than one parent, but there is no notion of inheritance. For modeling simplicity, assume that a node has only one parent. The presence of a link from upwards node A to node B expresses the logical implication $\forall x. A(x) \supset B(x)$. Three attributes are associated with each node: node strength NS, node cost NC, and node rank NR. The strength $NS_{ij}$ of node $N_{ij}$ is obtained from historical data and the opinions of experts, and represents the degree of belief or certainty that node $N_{ij}$ is responsible for the symptom(s) described at its parent node, $N_{i-1,(ceil(j/n))}$. $N_{ij}$ is the jth node in level i. Therefore, its parent is the (ceil(j/n))th (ceiling of j/n) node in level i−1. It is required $$\sum_{j=1}^{n} NS_{ij} = 1.$$

In other words, the sum of the strength of all the children nodes of each parent node is unity. The node strength $NS_{ij}$ represents a combination of an expert-defined endorsement and the historical information accumulated during use. The cost $NC_{ij}$ represents the relative cost (in dollars, time, or other resources) of performing, testing, and verifying the conditions and actions described at the node. For computational simplicity assume $0 \leq NC_{ij} \leq 1$ for all i and j. $NC_{ij}=0$ means no cost, time, or effort, while $NC_{ij}=1$ means extremely costly, very time consuming, or very difficult. The NR is the ranking of a node among its siblings.

Each sub-task identified in the knowledge acquisition step is mapped to a knowledge module, implemented as a CAT. Each node in a CAT may have one or many possible branches associated with it. Branches (child nodes) are sorted according to their node rank NR, which reflects the most natural, useful, and meaningful ordering of all sibling nodes in a group when presenting them to a user (NR=1,2, . . . , 999). A node with NR=1 will appear at the top of an option list when presented to the user during the diagnosis. Each leaf node has two attributes: "Fixed" and "Not Fixed." Fixed is the confirmation by the user that the solution (procedure) presented by the CAT up to that point resolved the problem. Not Fixed, indicates that the solution did not solve the problem or produce a favorable resolution. A node in CAT is either a question node or an action node. A question node asks the user for information or verification of some attributes. An action node asks the user to perform specific actions (measurements, component or attribute testing or verification, etc.) or calls upon services to perform some actions. In addition, each node contains the following information:

1) Questions to be asked or tasks to be performed to confirm or disconfirm a particular symptom.
2) What (a clarification of questions or actions).
3) Why (an explanation or justification for questions or actions).
4) Additional information to be presented (pictures, animation, video, audio).
5) Services (record session log, tools maintenance log, user log, etc.)

A hierarchical knowledge processing algorithm in accordance with one aspect of the present invention employs a hierarchy of abstract problem spaces, called abstraction spaces, to focus a search process. Instead of attempting to solve a problem in the original problem space, called "ground space," the present invention first searches for a solution in the most abstract problem space to produce a skeletal plan. This plan is then refined at successive levels in the hierarchy by inserting additional operators to produce a complete sequence of ground-level operators (see FIG. 1a–1c).

Figure 10:
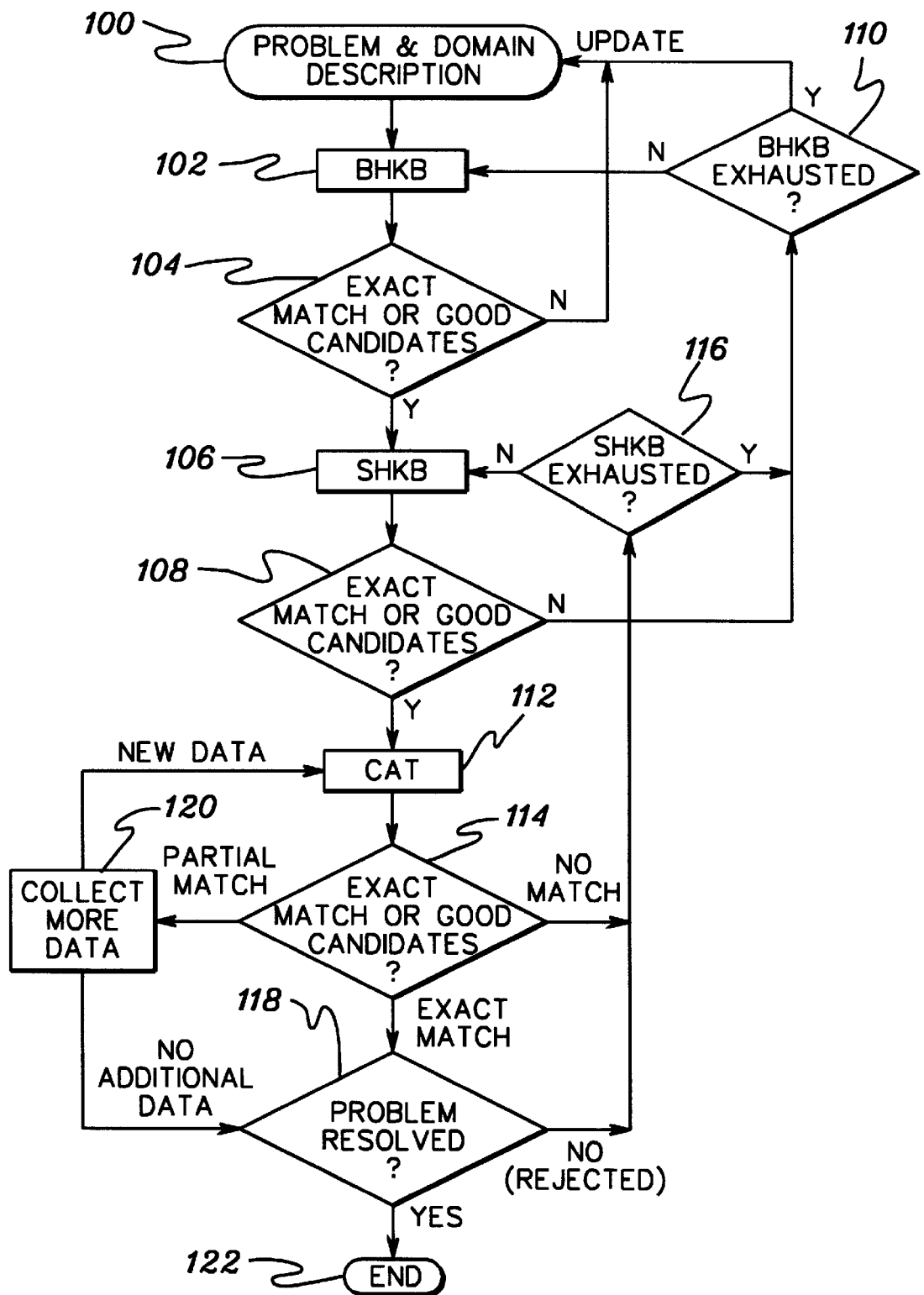
FIG. 10 is a flowchart of one embodiment of inferential knowledge base processing by an inference kernel in accordance with the present invention.

Given a problem description, the knowledge processing algorithm in accordance with the present invention proceeds as shown in FIG. 10. First, the given problem, 100 "Problem & Domain Description," is mapped into the most abstract space, or "BHKB" (FIG. 1a), by deleting literals from the initial state and goals that are relevant to the abstraction space. Next, a solution is found if it exists, 104 "Exact Match or Good Candidates?", that solves the abstract problem, 106 "SHKB." Each intermediate state in the abstract plan serves as a goal for the sub-problems at the next level in the abstraction hierarchy. The algorithm then solves each intermediate sub-problem using the final state of one sub-problem as the initial state for the next sub-problem, 108 "Exact Match Or Good Candidates?". If "no," processing next determines whether the abstraction space has been exhausted, 110 "BHKB Exhausted?". If again "no," processing returns to instruction 102 where a next BHKB node is obtained. If "yes," then from inquiry 110 processing updates the problem or the domain description. The process is repeated until the plan is refined to the ground level space (Goal, Evidence, or Solution nodes in FIG. 1c), 112 "CAT."

With the domain knowledge encoded in the diagnostic knowledge modules, the diagnostic reasoning process follows the maintenance, troubleshooting, or evaluation paradigm captured in the knowledge engineering stage. A maintenance expert, for example, begins the diagnostic process by first observing and examining the overall performance characteristics of the equipment. The proposed architecture can duplicate this action by presenting a hierarchy of problem description menus from which the user selects. As the user proceeds through these initial "problem identification" menus, the questions become more specific, and a description of the problem is compiled. At each step this description is matched against the entry node of all resident knowledge modules and the user is presented with questions, data panels to be filled, multiple options from which to select, option lists to rank, or tool parameters to be measured or examined. The system then evaluates user responses and requests and identifies relevant knowledge modules or services. Inference control is passed to the appropriate module.

At each step, any of the service objects may be called upon to improve the quality of interaction.

Continuing with FIG. 10, from instruction 112 processing determines whether an exact match or good candidate exist in the ground level space, 114 "Exact Match Or Good Candidates?" If no match exists, then processing returns to the previous abstraction level to determine whether all SHKB nodes have been exhausted, 116 "SHKB Exhausted?" If "no," return is made to instruction 106, while if the structural nodes have been exhausted for the particular behavioral node then processing determines whether all behavior nodes have been exhausted, 110 "BHKB Exhausted?". Assuming that there is a partial match in the ground level space, then the inference processor collects more data, 120 "Collect More Data." If more data is available, then processing returns to instruction 112, while if no additional data is available, processing determines whether the problem has been resolved, 118 "Problem Resolved?" Alternatively, with identification of an exact match at inquiry 114, processing passes to inquiry 118 directly. If the problem has not been resolved (i.e., is rejected), then processing returns to inquiry 116. Once resolved, inference processing is complete, 122 "End."

Entropy is a commonly used measure for ranking information sources. It is based on the assumption that the uncertainty regarding any variable x characterized by a probability distribution p(x) can be represented by the entropy function:

$$H(x) = -\sum_{x} p(x) \text{Log}(x)$$

Most prior approaches fail to take into consideration the cost of important activities associated with diagnosis such as verification, availability, replacement time, tool down time, etc. In addition, cost is often not utilized in the first stage of reasoning, but only in shallow knowledge reasoning.

Most entropy approaches by definition do not incorporate any attribute (e.g.,cost) except estimated probability. In order to accommodate other attributes, the entropy function must be modified. One modified form of entropy is called "useful information," upon which the preferred entropic measure is based. Given the node strength $NS_{ij}$ and node cost $NC_{ij}$, a node's entropy is defined in terms of its children's node strengths and node costs as shown above. Again, it is assumed that a node has n children and the CAT has i levels.

$$H_{ij} = H_{ij}(NS, NC) = -\sum_{k=((j-1)n)+1}^{jn} NC_{(i+1,k)} NS_{(i+1,k)} \ln NS(i+1,k)$$

where $$0 \leq NC_{(i+1,k)} \leq 1$$

and $$\sum_{k=((j-1)n)+1}^{jn} NS_{(i+1,k)} = 1$$

Whenever a user does not know the answer to a question (unknown), or cannot select an option from a presented list (conflict or incomplete information), the branch with the lowest entropy $H_{ij}(NS, NC)$ is selected. This allows the user to continue with the diagnosis and be able to examine the following steps.

Given a problem description (malfunction, process problem, product problem, etc.) and a problem domain (tool, process, product, control system, task, etc.), the basic cycle of the algorithm is to find (interactively and cooperatively) the problem domain (BHKB), problem category (SHKB), problem type (CAT), and a resolution (CAT leaf node), as described above in connection with FIG. 10 and outlined below.

Step 0: Given BHKB, SHKBs, and CATs, initialize all and evaluate all entropies.

Step 1: Present description of design environment, problem, and symptoms to BHKB.

Step 2: Starting at the root, select a node in the next level which satisfies the design environment attributes (corresponding to the level) given in Step 1. If there is no exact match, select the node with lowest entropy. Update entropy list by deleting the selected node from list. This node is now the root of the remaining tree. If the entropy list is exhausted, return to Step 0.

Step 3: Repeat Step 2 until a terminal node of the BHKB is reached. If there are multiple terminal nodes or candidates, rank them based on the entropy of the root node of the corresponding SHKB. Then activate a candidate SHKB.

Step 4: Starting at the root of the active SHKB, select the node in the next level which matches the problem and symptoms given in Step 1. If there is no exact match, select the node with lowest entropy (update entropy list). If the entropy list is exhausted return to Step 2.

Step 5: Repeat Step 4 until a terminal node is reached. If there are multiple terminal node candidates, rank them based on the entropy of the root node of the corresponding CATS. Then activate the candidate CAT with the lowest root node entropy.

Step 6: If the problem is resolved, processing is done. Else if the solution is rejected by the user or there is an unknown problem, and the CAT list is not exhausted, present the next CAT. If the CAT list is exhausted, update $NS_{ij}$ of the terminal node of SHKB corresponding to the rejected CAT. Reevaluate entropy for all parent nodes of this node, until the root of the SHKB is updated. Then update the node strength of the corresponding terminal node in BHKB and reevaluate entropy for all parent nodes of this terminal node, until the root of the BHKB is updated. Return to step 2.

When a CAT at a terminal node in SHKB does not produce a satisfactory solution, or the SHKB linked to a terminal node of a BHKB does not converge, the terminal node strength needs to be updated to reflect this scenario. Updating a terminal node strength affects all its siblings' node strengths. The heuristic described below reduces the node strength as a function of the weakest node, but keeps the sum of all node strengths unity. Once node strengths are updated, new entropies are evaluated and propagated upward to the root node.

Step 0: Update $NS_{ij}$ of the node $N_{ij}$.

Step 1: Identify the total number of siblings (q) If $N_{ij}$ is the only child, return 0.

Step 2: Identify the node with minimum node strength ($NS_{ik}$).

Step 3: Subtract $Z=NS_{ik}/q$ from $Ns_{ij}$ ($NS_{ij}=NS_{ij}-Z$).

Step 4: Increase the node strength of all siblings of $N_{ij}$ by $Z/(q-1)$.

In some cases, users may not want to go through a step-by-step diagnostic procedure, since the user may know what he is looking for; e.g., the problem is known, but all the steps involved aren't. To address this situation, summaries and conclusions are preferably generated at the end of diagnostic sessions. In addition, cases can be collected, organized, and converted to an on-line hypertext case-base.

Such a case-base could serve as a fast path for expert users who know what they are looking for and do not wish to go through a step-by-step diagnostic process. Each case is preferably organized into five fields; namely, case_title, symptoms, actions, problem, and solution (described below). Users can query the case-base on any combination of keywords in any field. The case-base preferably comprises a hypertext document and provides fuzzy search capability based on the word root as well as wild character and multiple word searching. In case of multiple matches, it opens up to the first match, with the case_title of all matched cases displayed in a selectable list box.

CASE_TITLE: Problem class, group and category

SYMPTOMS: List of all symptoms reported by the user during the diagnosis

ACTIONS: List of all actions recommended or performed by the user

PROBLEM: Final diagnosis of the real cause of the symptoms

SOLUTION: The corrective actions which fixed the problem

Figure 11:
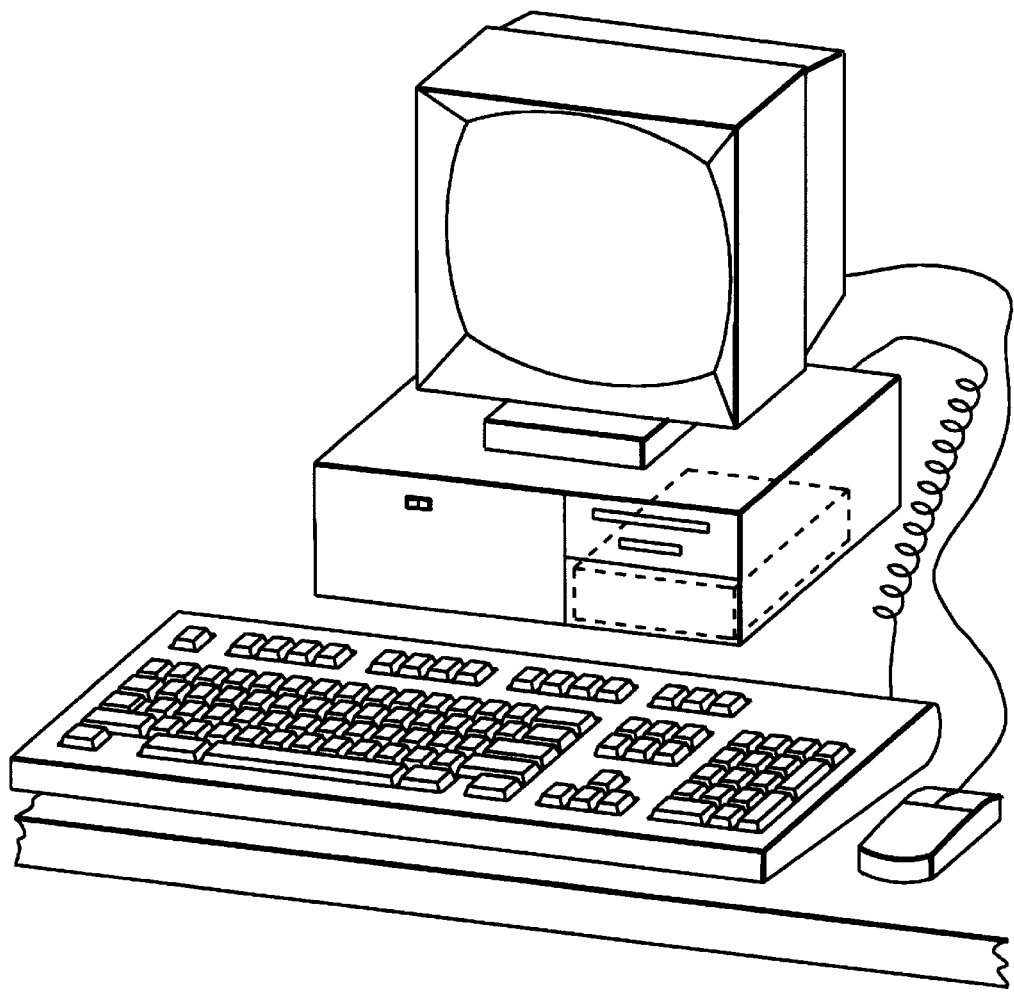
FIG. 11 is a perspective view of a computer system upon which an expert system and/or a multimedia/hypermedia system in accordance with the present invention may be implemented.

By way of example, FIG. 11 depicts a computer system upon which the expert system (and/or multimedia/hypermedia system) in accordance with the present invention can reside. This computer system may comprise an IBM PS/2 microcomputer system employing a 386 or faster processing chip. In addition to a hard disk and floppy disk drive, the computer system has a video adapter, a video display monitor, a keyboard and a mouse-type data manipulation device, all for user interface with the expert system. If desired, the expert system (and/or multimedia/hypermedia system) could be implemented on a portable system, such as a laptop or notebook computer.

Figure 12:
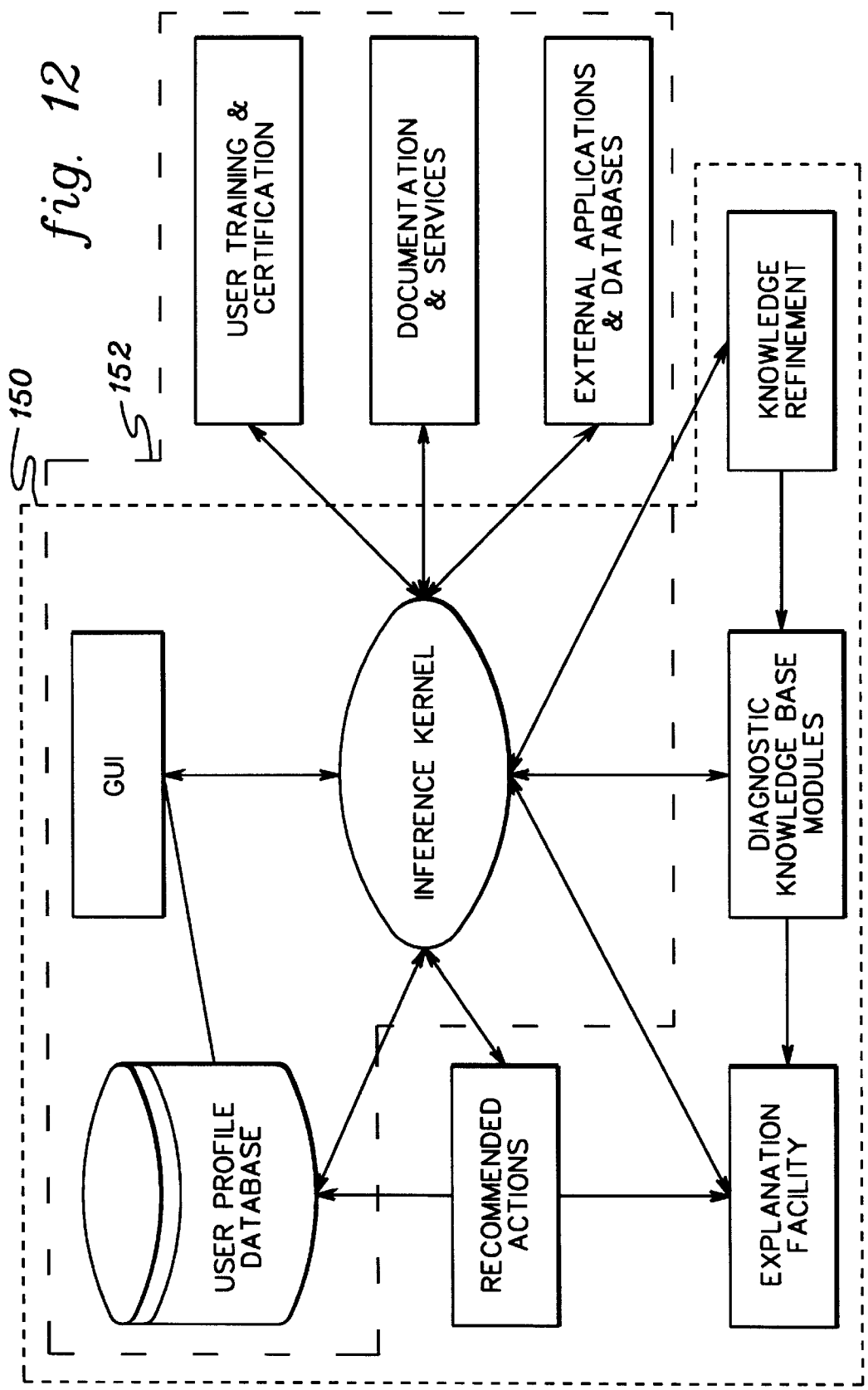
FIG. 12 is a block diagram representation of possible component overlaps of both an expert system and a multimedia/hypermedia system in accordance with the present invention.

Architecture frameworks for an expert system 150 and a multimedia/hypermedia system 152 in accordance with the present invention are depicted in FIG. 12. This object-oriented modular architecture is comprised of a collection of interacting knowledge modules and "utilities," including training modules, on-line documentation and service modules, external applications, and databases arranged around an inference kernel. As used herein, a "utility" is a module containing non-inferentially accessible information.

As described further below, training modules are multimedia applications which provide on-line training based on user experience level (beginner, novice, intermediate, expert). The user profile database records user expertise levels, tasks and procedures that users are certified for, certification dates, and work experience histories. The user profile database is maintained by an area administrator and is accessed and updated by the certification modules. On-line documentation provides information on processes, tools, logistics, and other aspects of the task. User guides, operational manuals, manufacturing procedures, design guidelines, etc., are implemented as hypermedia documents. Service modules provide various communication and presentation services between the user and the system. These services include displaying high resolution images, playing audio segments, playing motion video and animation, logging tool, process, and area histories, establishing session defaults, logging user feedback, and various report printing facilities. Diagnostic knowledge base modules provide the interactive multimedia tool and process diagnosis described above. A user accesses the inference kernel through a graphical user interface.

Graphical user interfaces (GUI), multiple screen displays, and windowing capabilities have provided powerful possibilities for user interface design in recent years. Many researchers in the field of human-computer interaction and cognitive science have extensively studied the effects and requirements of such an interface environment on users as well as system design. With the advent of windowing and multiple screen displaying capability, additional issues and concerns have to be taken into consideration in design of computer user interfaces.

Figure 13:
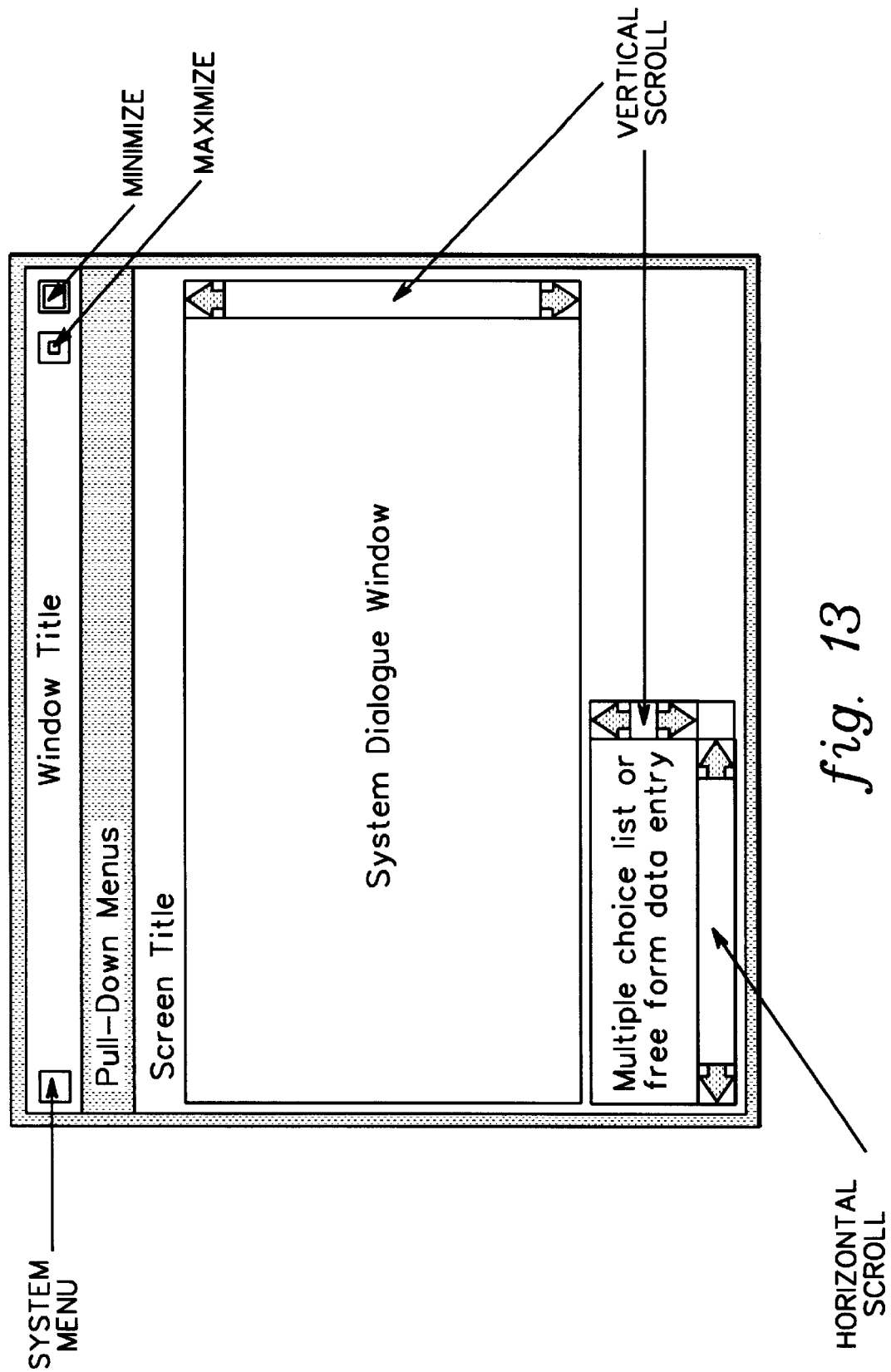
FIG. 13 is an example of one embodiment of a graphical user interface window in accordance with the present invention.

The user interface is a graphical, window-based interface consisting of visual representations and interaction facilities (e.g., see FIG. 13). Interaction with the system is through a menu-driven, point and click interface. Manual data entry and typing are kept to a minimum. The user interface methodology is based on IBM's Common User Access (CUA) architecture. CUA is a set of guidelines to be used to design user interfaces that are easy to learn and use. The CUA architecture defines the workplace environment for programmable workstations. These guidelines are based on user-interface and object-oriented relationships and have been supported by human factors research and usability testing. They specify common user-interface components and techniques, as well as guidelines for applying them. The pull-down menus and system menu are consistent with IBM OS/2 Presentation Manager standards and the IBM CUA guidelines, as shown in FIG. 13.

The appearance of and interaction with the interface are consistent throughout system applications. Menu options and choices are selected by double clicking. Data entry is performed by typing and clicking on the "OK" button or pressing the "Enter" key. Multiple choice selections are made by placing the cursor on the selection and double clicking on the mouse button or by pressing the "Tab" key to highlight the selection and then pressing the "Enter" key to make the selection. All user interface functions are accessible via the keyboard as well as the mouse (a CUA requirement).

There has been a lot of research in the field of user interface design principles, styles, and standards. Cognitive and computer scientists have produced valuable and practical user interface design principles and guidelines. Several sets of standards and guidelines have also emerged in the computer industry, such as IBM's Common User Access (CUA) guidelines and user interface design principles.

Common User Access (CUA) describes principles, components, and techniques for user interface design in general, as applied to a variety of software products for a variety of operating environments. It also describes the process of designing a product with a CUA interface in particular. The CUA user interface is a graphical interface that incorporates elements of object-orientation, i.e., an orientation in which a user's focus is on objects and in which the concept of applications is hidden. The CUA user interface is based on principles of user-interface design, on object-oriented relationships, and on field experience and user testing.

The CUA guidelines provide information about how the model on which a product is based should be conveyed to a user. The CUA guidelines also include specific details about designing and developing computer software and user interfaces. Products that adhere to the CUA guidelines and undergo usability testing should be comparatively easy to learn and use. As a result, users of products with a CUA user interface should find the products easy to use, efficient, and appropriate for the tasks that users want to accomplish. With respect to the user interface, three models come into play:

1. A user's conceptual model;
2. A programmer's model; and
3. A designer's model.

Figure 14:
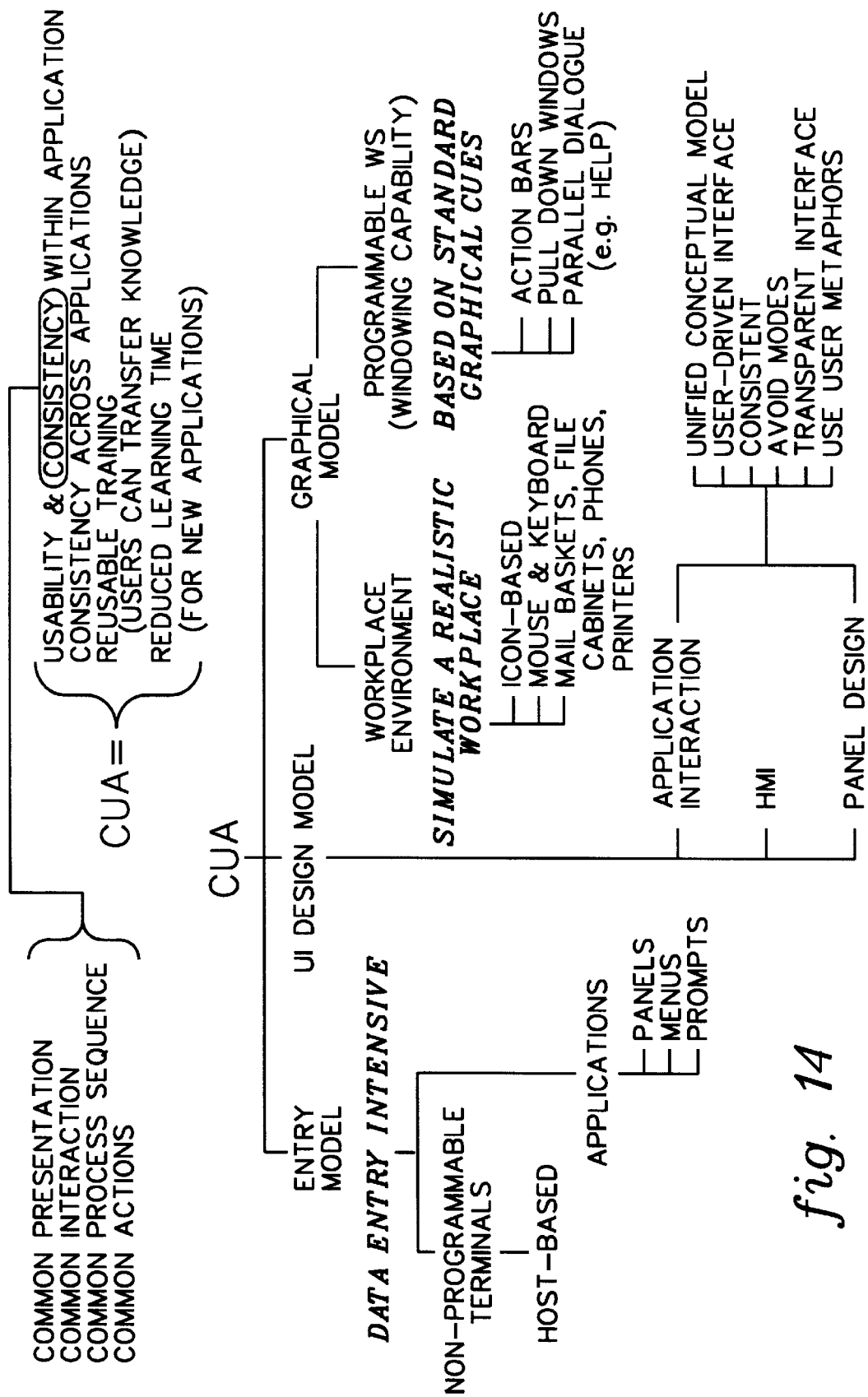
FIG. 14 charts IBM's common user access (CUA) guidelines and user interface design principles employed in a graphical user interface in accordance with the present invention.

A user's conceptual model is a mental model. A programmer's model and a designer's model are explicit and consciously designed. Each model represents a different audience's perspective of user interface. FIG. 14 shows a summary of CUA and the various interface models it supports.

Figure 15:
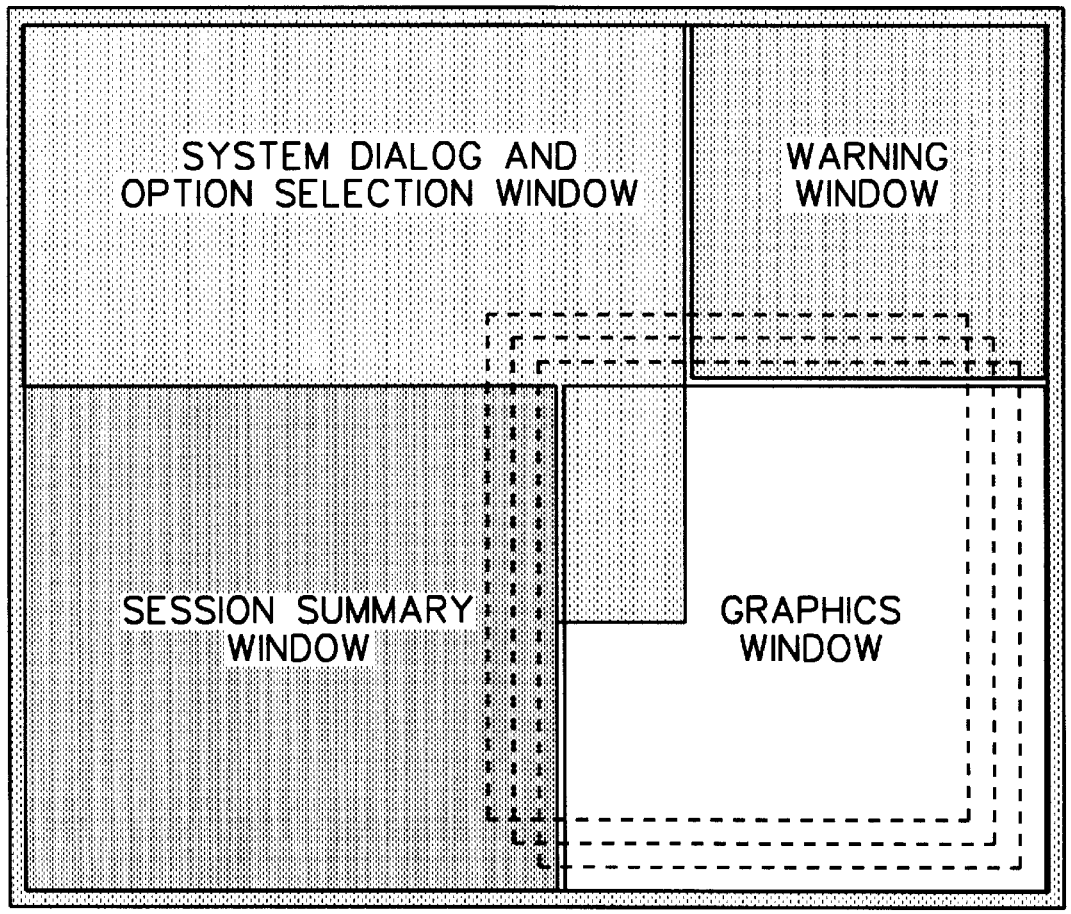
FIG. 15 depicts one embodiment of a graphical user interface window partitioning in accordance with the present invention.

In addition to a consistent dialogue and interaction, the window structure proposed here also provides a consistent windowing structure. As shown in FIG. 15, the screen is divided into four sections. The system window (upper left) contains the system dialogue, action bar menus, options, textual information to be displayed to user, and the standard IBM Presentation Manager service icons (minimize, maximize, scroll up, scroll down, and system menu). The summary window (lower left) appears at the end of a diagnostic session or when a conclusion is reached. Warnings, notices, and important messages are displayed in the warning window (upper right) in a bright color to get attention. All graphics, digitized images, pictures, diagrams, slide shows, animations, and scanned schematics appear in the graphics window (lower right). If there is more than one picture to be displayed, multiple graphics windows are opened on top of each other with a 20 pixel offset toward the center of the screen. Any graphics window can be brought up to the front by just clicking on any exposed part of it. All windows are opened and closed by the system during the session, but the user can also minimize, maximize, or close any of the windows except the system window at any time. The exception to the above is the external application windows which open in the center of the screen, but can be moved, minimized, or maximized.

Since the systems proposed herein might be used in a semiconductor manufacturing environment, an important issue in the design of the user interface is color considerations. For example, semiconductor manufacturing includes areas with soft yellow lighting (clean rooms), soft white lighting, and bright white lighting. Window backgrounds, highlightings, text, and image annotations have to be visible and distinguishable in all these environments. Although a single set of colors suitable for all occasions and all environments has not been found, some color combinations are more suitable for some areas. For example, multimedia documents with considerable textual information are much easier to read and focus on in clean room environments when the background is black, text white, and highlights are bold large font. In addition, human factors analysis has revealed some problems and limitations in use of colors which have to be taken into consideration. For example, many color-blind people have trouble seeing red and green. Some see no color at all; others cannot distinguish blue from purple. For these reasons, use of color for highlighting is not recommended and should be avoided.

In designing the User Interface (UI) several other factors have to be taken into consideration. Most computer-based applications and services with which operators deal are either on character-based non-programmable terminals, with display of one window at a time, very little mouse use, and few selectable options, or are designed as character-based, single window (full screen) applications. So, the operators using the system should be empowered but not overwhelmed by too many choices, options, and windows. Therefore some features of the UI, such as window position and size, can be fixed and predefined to reduce the required user intervention.

Throughout the UI and application development, terminologies, keywords, and buzzwords known to the manufacturing personnel should be used. Such terminology can be compiled during meetings, interviews and/or supervised interaction sessions. Terminologies, symbols, and acronyms used in vendor manuals and troubleshooting guides can also be utilized to assure consistency with a current mode of operation and to provide a user friendly and familiar work environment.

Document s incorporated in the diagnostic modules, a s well as on-line documentation and training documents should provide "linguistic-based" search and match functions. This will allow searches for words based on word root and "wild cards". This allows search and match for information rather than just an exact match. This linguistic-based search and match concept exists in IBM's Book Manager product. In addition, a table of "linguistic hedges" can be developed which contains list s of equivalent and similar phrases and keywords. This table can be customized for manufacturing in general, or semiconductor manufacturing in particular.

A user interface is considered adaptive if it changes in some way in response to the person who is using the system. Such an interface uses information about the user's goals, the current active objects, and the strength of association between these objects to dynamically order the list of panels, items in a list box, or topics presented in a multimedia or hypermedia document (discussed below). During consultation, the user is presented with a list of relevant and relative options at each step. At the beginning of the session, these lists are very high level and not very long. As the session progresses and travel occurs further down the classification tree, the number of options could be quite large.

In some cases it becomes necessary to sort the lists presented to the user, based on likelihood of usefulness or relevancy, and based on past experiences. Note that in navigating through the CAT, the user might have to select one of several options at a node. With an unordered list, the user has to search and try on average N/2 options (N=total number of options to select from). With an ordered list it would take 2M/N (i.e., M/(N/2)=2M/N) as much option scrolling before the user reaches the target option (i.e., the correct one). M is the number of options above the target option in the ordered list. Of course, it is assumed that M <N/2, and in fact results reported by other researchers in the field of adaptive tutoring systems and intelligent interfaces support this assumption.

In the present user interface methodology, the items in an option list box are ordered according to the predefined node rank (NR) and node strength (NS). Node rank specifies the order in which options are displayed in the list box. This initial ordering and node strength assignment is based on a study of existing cases and feedback from experts. Preferably, the system should be able to dynamically enhance and reevaluate the node ordering, node strength and eventually knowledge base ordering. In other words, a form of unsupervised learning is desired based on existing resolved cases. In addition, the network should be able to track its utilization and adjust and reevaluate its node ordering and node strength according to the frequency of use. Assume arc AB is a section of a knowledge tree.

$$A \left| \frac{S_{AB}}{S_{BA}} \right| B.$$

$S_{AB}$ means the degree of association between node A and B through arc AB. This is the link strength, or the degree of evidence or certainty that following arc AB will advance problem resolution toward a final solution. $S_{BA}$, on the other hand, refers to the backward chaining of the same event. All arc strengths ($S_{AB}$, $S_{AC}$, $S_{AD}$, . . . ) start at 1, and are increased by one each time the nodes are selected. In essence this rule makes the assumption that the more a link has been used, the more likely it is to be useful now and in the future. Once node A is activated, the next path (AB, AC, or AD, . . . ) will be affected by the strength of all possible arcs ($S_{AB}$, $S_{AC}$, $S_{AD}$, . . . ). Arc strengths are then normalized and converted to node ranks.

Coordinating text, graphics, and images in a multimedia environment is very important to effective presentation and management of the subject matter. The multimedia interface methodology of the present invention is based on a predefined presentation scenario and is implemented in one of the predefined templates.

Specifically, multimedia modules are partitioned into "logical pages." A logical page (e.g., FIGS. 16a–16p & 17) consists of a set of images (still, video, animation, graphics) and all associated description (text and audio). In other words, a logical page is the predefined collection of all related information (text, graphics, images, audio instruction, animation, video clips) which can be made available to the user. The appearance, format, and access to logical pages is preferably consistent throughout the system. Logical pages are related to each other via hypertext and hypergraphic links.

To assure a complete and accurate display of a logical page (regardless of how it is addressed), it can only be linked to via its primary window. A logical page, similar to a page of a book, may contain many different objects of interest, but can only be opened by a call to its primary window. All other windows in a page are either dependent and automatically linked to the primary window or are pop-up windows which are activated via hypertext or hypergraphic links. When a primary window is opened (via hypertext link, hypergraphic link, selection from table of contents, external call, or as a result of a search) all its dependent secondary windows are opened automatically. The following is the source code for the logical page shown in FIG. 17.

```
:userproc.
:docprof ctrlarea=none toc=1 dll = 'Logic_pg'
objectname='Logical_Page_Main' objectid='file.opt'.
:title. Wafer Polisher
:hl res=10 x = left y = bottom width=40% height=100% group=1
    titlebar=none scroll=vertical rules=none.Polish Arm
:link reftype=hd res=11 group=2
    vpx=right vpy=top vpcx=60% vpcy=50%
    auto dependent.
:link reftype=hd res=12 group=3
    vpx=right vpy=bottom vpcx=60% vpcy=50%
    auto dependent.
:p.:hp2.Polish Arm:ehp2.
:p.Polish Arm rotates Carrier to (primary) :link.reftype=hd res=20.
Polishing Station Plate:elink..Polish Arm lowers carrier to platen and
(primary) polishing begins.
:p.:link refid=wafer reftype=fn.Wafer:elink. carrier rotation speed is
programmable . . .
. . .
:h2 res=11 ctrlarea=none hide nosearch noprint titlebar=none
rules=none.
:artwork name='arm.bmp' linkfile='arm.hgl'.
:h2 res=12 ctrlarea=none hide nosearch noprint titlebar=none
rules=none.
:artwork name='current.bmp'.
:fn id=wafer.
Thin slice cut from a cylinder of a single-crystal silicon, upon which . . .
:efn.
. . .
:euserdoc.
```

A logical page always has a text window which serves as its primary window, except full screen non-textual pages (image, graphics, audio, motion video, animation, external applications) in which case the page title is considered the textual window. A window can be assigned vertical and horizontal scrolls, as well as title, background and foreground colors, font style and size. It is recommended that text windows be assigned only vertical scrolls and allow the Information Presentation Facility (IPF) compiler (marketed by IBM) to fit and wrap the text in the window.

In addition to hypertext links, interactive multi-function hypergraphic links are also preferably provided. Images or components in an image can be linked to other sections of the document, other images, or even other documents via hypergraphic links. "Hot-spots" defined for an object or for an entire image are used to make the object or image selectable. Each hot-spot has a function pop-up menu which is selected by clicking on the object. Then a specific function is selected by clicking on the desired function button/symbol.

Figure 16A:
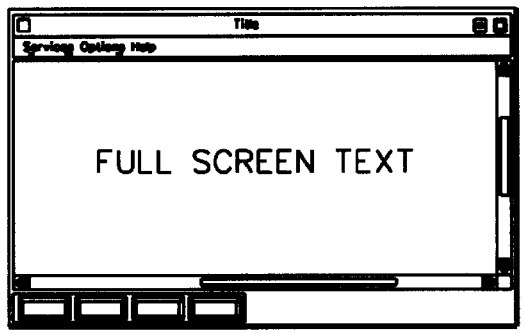
FIGS. 16a–16p depict standardized programmable templates (referred to as "logical pages") proposed for use in a multimedia/hypermedia system in accordance with the present invention.
Figure 16B:
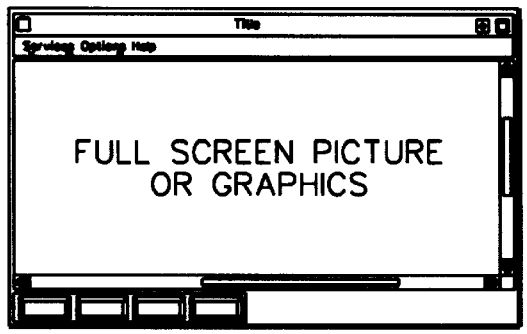
Figure 16C:
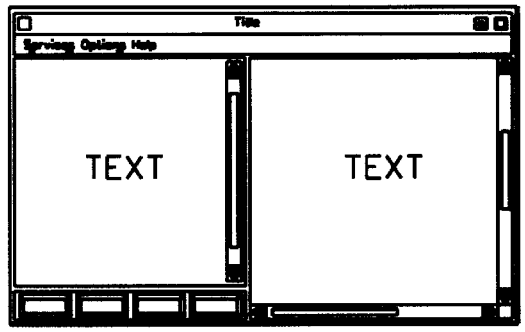
Figure 16D:
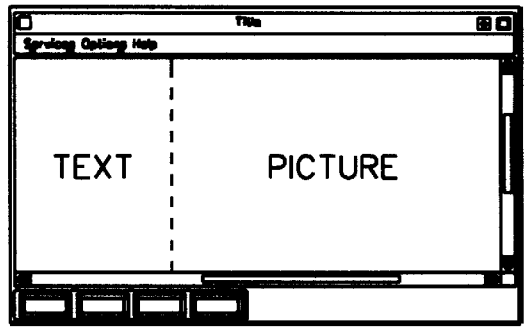
Figure 16E:
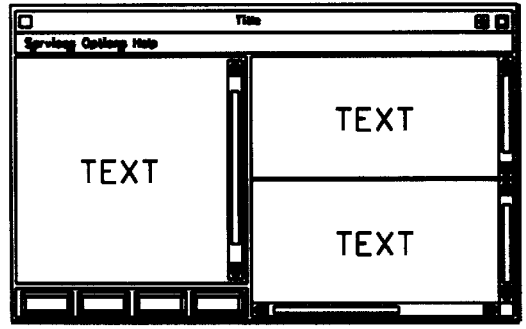
Figure 16F:
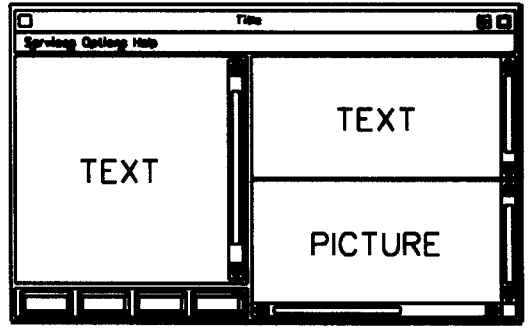
Figure 16G:
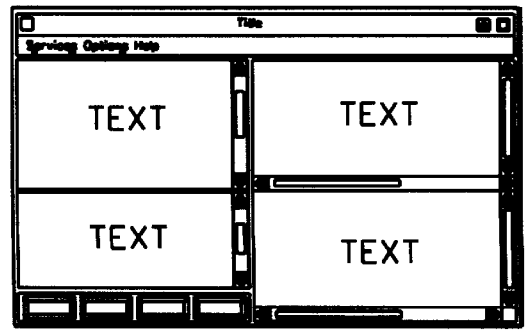
Figure 16H:
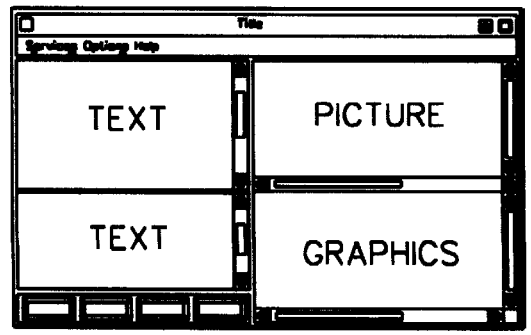
Figure 16I:
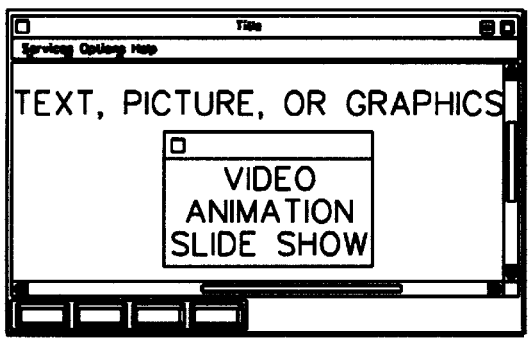
Figure 16J:
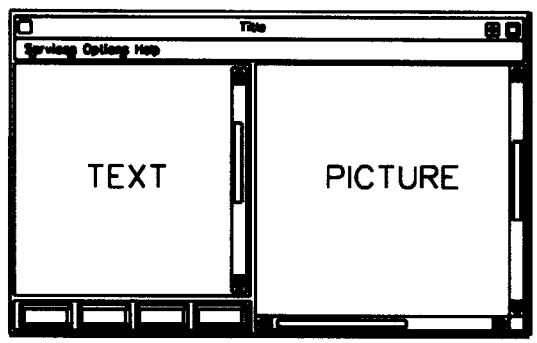
Figure 16K:
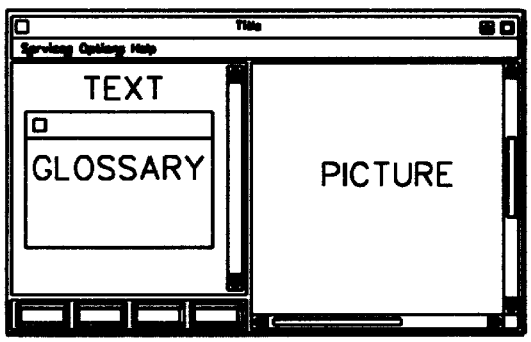
Figure 16L:
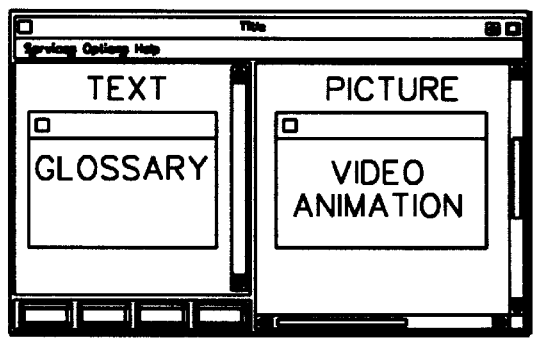
Figure 16M:
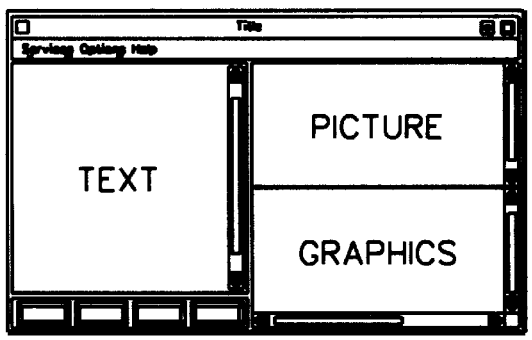
Figure 16N:
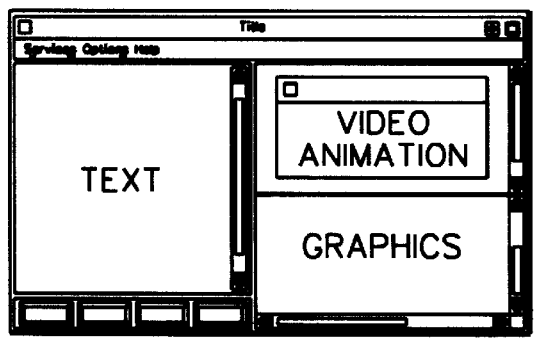
Figure 16O:
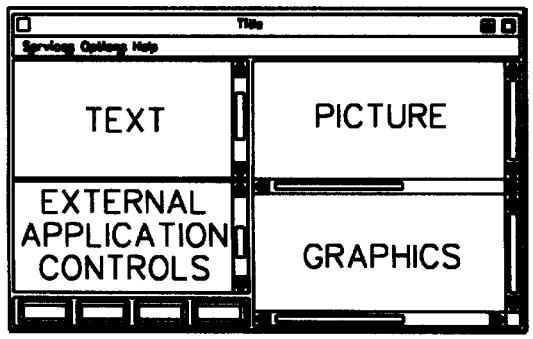
Figure 16P:
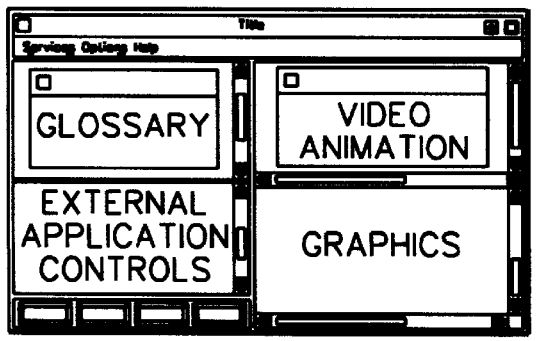
Figure 17:
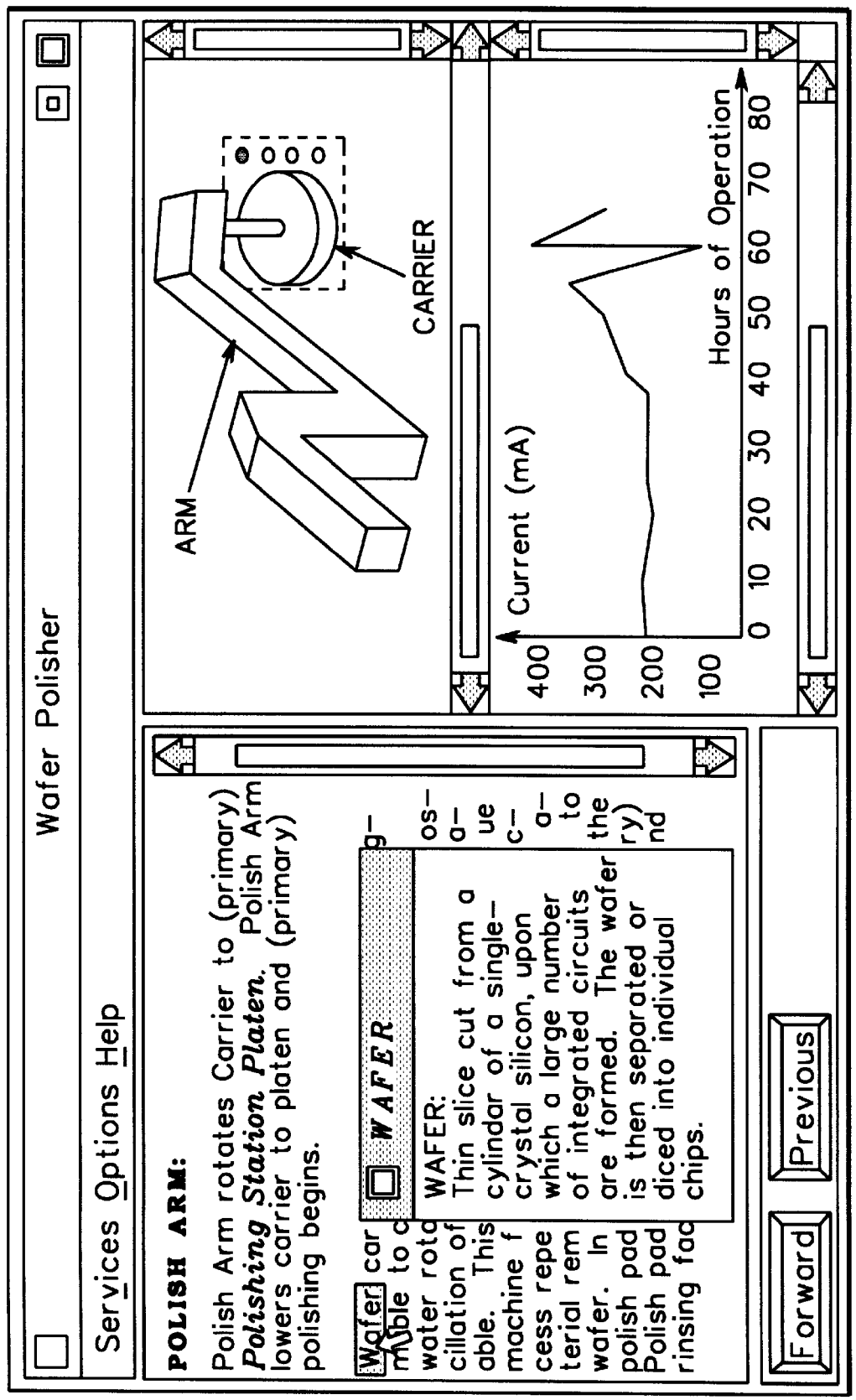
FIG. 17 is an example of a logical page partitioning of a multimedia/hypermedia module employing a template of FIGS. 16a–16p.
Figure 18:
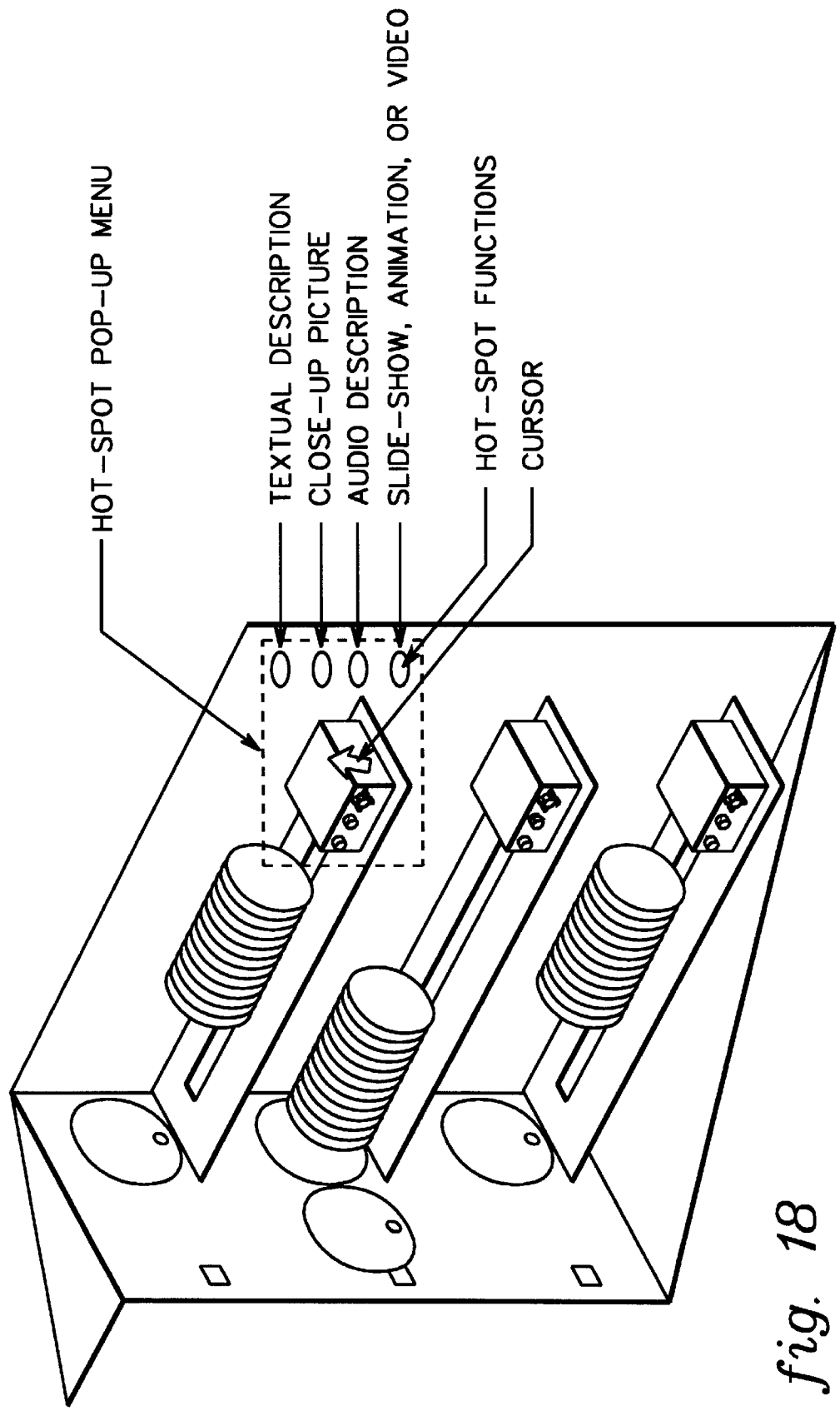
FIG. 18 is an image useful in explaining hypergraphic hot spot functions in accordance with the present invention.

To accommodate various situations and to maintain consistency among multimedia modules, a set of "Logical Page Templates" are defined (e.g., see the partial lists of FIGS. 16a–16p & 17). These templates provide consistent facilities for embedding various multimedia and hypermedia utilities and functions in applications. These logical page templates facilitate sharing of multimedia modules among applications and also among other similar systems developed in other parts of a company.

Figure 20:
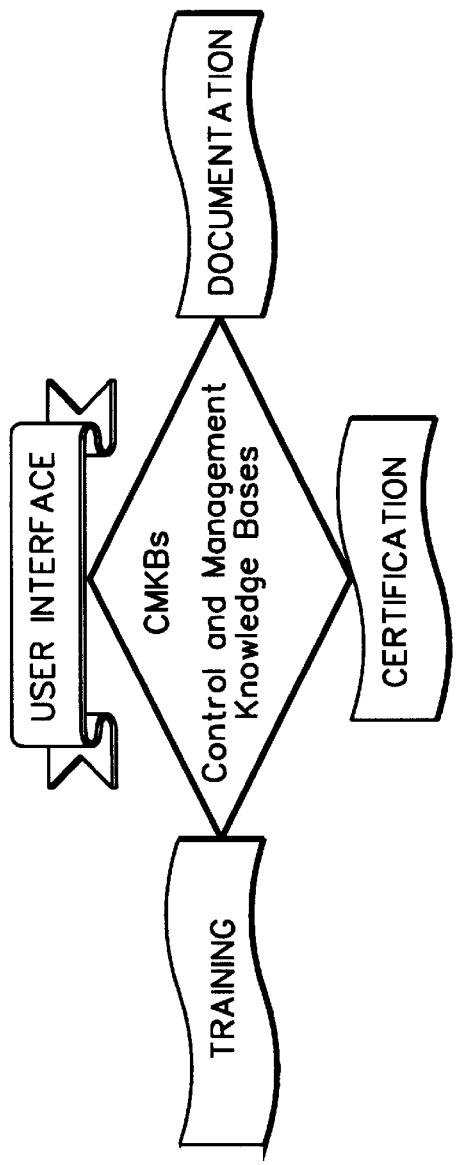
FIG. 20 is a block diagram representation of one embodiment of a knowledge-based multimedia training/certification system in accordance with the present invention.

A complete and integrated methodology and architecture for development of intelligent interactive multimedia/hypermedia computer-aided training and certification applications in accordance with the present invention is next described (see FIG. 20). The methodology takes full advantage of modern multimedia workstations. Hypertext, hypergraphics, high resolution images, audio, motion video, and animation are technologies that in synergy are far more useful than each by itself. The modular and object-oriented architecture provides an interactive and cooperative computer-aided training and qualification development environment. The Control and Management Knowledge Bases (CMKBs) serve as an intelligent tutoring system framework. A major departure of the approach described herein from previously reported computer-aided training and intelligent tutoring systems is the seamless integration of training, certification, and on-line documentation with knowledge-based control and management.

Existing multimedia training methodologies usually require a large initial course preparation investment and are suitable only for relatively stable subject matters. Such applications usually require specialized, and often expensive, hardware and software. The interactive multimedia training and certification methodology presented herein is based on standard IBM OS/2 features and a set of novel tools and techniques (described above and below), and provides modular, easy to upgrade, customizable training modules without any additional dedicated hardware or software. Applications developed under this methodology and architecture reside entirely on hard disk or removable/rewritable storage medium (i.e., optical storage) and can be used in stand-alone or network configuration.

Traditional Computer Based Training (CBT) and Computer-Assisted Instruction (CAI) teach a subject by offering corrective feedback based on a large, pre-stored set of problems, solutions and associated remedial advice. The most noticeable problem with CBT and CAI is the amount of time it takes to produce effective courseware as all possibilities need to be anticipated in advance by the author. Some Intelligent Tutoring Systems (ITS) have addressed this problem by providing an environment where problems are generated automatically. Such "generative" systems need only be given general teaching strategies and they could produce a large number of interactions without all of them being explicitly programmed in advance. However, most of these systems lack a clear representation of the knowledge that they are teaching.

In such systems there is a mismatch between the program's internal process and the trainee's cognitive processes. The trainee using CBT and ITS is usually denied any chance of using his/her initiative in guiding the learning process. The CBT and CAI strategy is "learning by being told". However, research has shown that "learning by discovery" and "learning by doing" are in many cases more effective strategies. A main goal in the training methodology described here is to reduce intimidation and to put the trainee in control of learning. Instead of sitting in a classroom listening to an instructor, or following an operator on the manufacturing floor (who is usually fighting fires and the last thing on his/her mind is training), the trainees work individually on computers that combine text, high resolution color images, graphics, audio, animation, and motion video. This environment is characterized by student sequencing through course material in a self-paced manner, while being monitored by the system. The goals in developing the proposed training methodology can be summarized as:

Shorten the training process.

Improve the training quality.

Provide consistent training across the board.

Produce modular and portable training courseware.

Effectively deliver and monitor the training objectives.

Enable domain experts to easily develop and modify multimedia training courseware by providing them with architecture, methodology, and necessary tools and techniques.

As noted initially, manufacturing lines can be serviced by hundreds of operators, production technicians, and maintenance technicians. Currently, a multitude of methods are used for educating and assisting manufacturing personnel. These methods include informal, unstructured training sessions, printed "in-house" manuals, sit-down classroom courses, and walk-thru orientations, to name a few. In such an environment, the student population grows with every group of new employees (temporary or permanent). This student group is large and decentralized. They cannot all be released from the manufacturing line simultaneously to take a standard training course.

A majority of the process engineers, process technicians, and senior operators interviewed emphasize that their major concern is the heterogeneous work environment within which they work. In addition, it is emphasized that the current training and certification methodologies are often inefficient and time consuming due to usual operator turn-around and frequent changes in the process and tools employed. In most cases, the new operators are trained by current operators and process technicians who have their own styles and biases. In addition, most of the information required for their regular activities are textual documents (softcopy or hardcopy).

Interactive multimedia training and certification offers consistent presentation of the subject matter, on a flexible 24 hour per day, seven day a week schedule. The subject matter delivered to the trainee is guaranteed to be consistent when such a methodology is used. Thus, a "Monday Morning Syndrome" is avoided, i.e., where some of the subject matter presented by a line technician to new hires might be a little sketchy or missing altogether. Using such an on-line computer-based training methodology also eliminates the back-level problem. Currently, using printed documents one is never sure if a line operator is using the most current revision or whether an operator's training had covered the latest version of process or tool upgrades. By making the information available "on-line," and integrating training, certification and documentation, better control is obtained over what information is being used and what needs to be disseminated.

The architecture presented below provides an intelligent, interactive and cooperative computer-aided training and qualification framework and can be classified as an Intelligent Computer-Aided Training (ICAT) or Intelligent Computer-Aided Learning (ICAL) architecture. The object-oriented modular architecture is comprised of a collection of interacting and cooperating modules arranged around the Control and Management Knowledge Bases (CMKBs), as shown in FIG. 20.

Training modules provide interactive multimedia training for tool, process, or business practices, as well as orientation for different areas or lines of business. Documentation modules provide on-line hypermedia documents covering all necessary information on tool, process, process parameters, logistics and various other application and data-bases which the end-user (operator, technician) comes in contact with. Certification modules provide an interactive knowledge based test, evaluation and feedback environment. CMKBs provide coordination, access control, and user management and serve as an intelligent framework for the training and certification process. CMKBs act as a liaison between the trainee and the multimedia information modules and qualification procedures. In fact, CMKBs depict a supervisor's role, and provide control and monitor access to information and generate study plans according to a student's background and progress.

A user profile database includes various information on the manufacturing personnel in each area. For example, it might include employee number, name, department, tools and processes for which the employee is certified, date certified, level certified (Beginner, Novice, Intermediate, Expert), and any expertise and authority level (system administrator, production technician, maintenance technician, operator, . . . ). Any module can query the user profile database directly, but the updates and modifications are managed by CMKBs or directly via Graphical User Interface (GUI) by authorized personnel (e.g., system administrator).

Active training modules provide interactive step by step guidance and monitor user responses and adjust/react accordingly. These modules usually cover the more complex scenarios where the system serves as an active participant in the process, analyzes user responses and formulates a corresponding action based on the response and the overall goal. Active training modules could ask trainees to perform specific tasks, examine tool components, review process procedures or make specific tool/process/product measurements before continuing to the next step. These modules are structured as implication networks or decision trees, and are implemented as Condition Action Trees. Active training modules are usually used for Beginner and Novice training, where the trainee needs step by step guidance, monitoring and feedback. They are also used in dangerous situations or when dealing with hazardous material.

Passive training modules can also provide step by step instruction and procedures, but they neither enforce it nor monitor the progress. Such modules are suitable for Intermediate and Expert users who may not require step by step control and guidance and do not have to be monitored as closely as Beginner and Novice users. Whenever multimedia and hypermedia modules are accessed directly, they provide passive training, whereas if these are presented via diagnostic knowledge bases or the CMKB, then active training is performed.

Computer-based training and intelligent tutoring systems are usually based on a single and simple student model. Regardless of the familiarity or lack of familiarity of the trainees with the topic, all go through the same training process. A new hire who has never worked in a similar environment is given the same training material as the one who has many years of related experience and might have been transferred to this new assignment from a similar area. Certification procedures are usually conducted orally in an ad-hoc fashion and are subject to a trainer's judgment and biases. In addition, there is no formal methodology for increasing the responsibility of a trainee as the training proceeds. In order for a computer-aided training system to acquire the necessary flexibility, it should distinguish between several types of students and structure the training material according to the students' needs and background.

Figure 21:
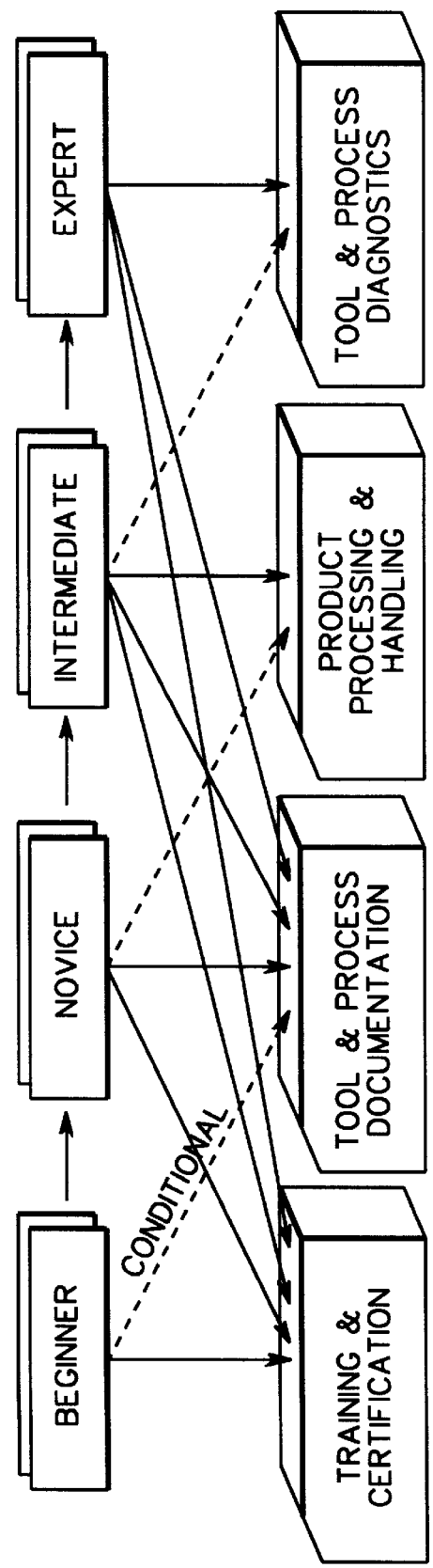
FIG. 21 is a block diagram representation of a multilevel training/certification user model in accordance with a multimedia system pursuant to the present invention.

To address this problem and to provide a methodology for presenting and managing the training material to students of varying background and expertise, a new multilevel student model has been developed (see FIG. 21). This new model advances a trainee's rank as the training progresses and as the trainee improves his/her certification test score.

Expert technicians and operators were interviewed to identify efficient methodologies for training the manufacturing personnel in their area. In other words, how should the training material be presented and managed for students of varying background and expertise? Four levels were identified: Beginner, Novice, Intermediate and Expert (see FIG. 21). A trainee rated as a Beginner, requires the most assistance and step by step guidance, whereas an Expert only needs to be able to locate information rapidly and efficiently. A student/trainee is assigned an initial level by the area supervisor. The student advances to the next level (increasing responsibility and access to information) as he/she passes the certification procedure for that level. As the user advances, the detailed procedural information is reduced, but the conceptual and deep knowledge (declarative and procedural knowledge) of the process is increased. A Novice user knows the steps involved in the operation, an Intermediate student should know the cardinality and temporal relationship to the steps. An Expert user would also understand the taxonomy of the tasks and procedures.

Such a multilevel student model reduces the danger of trainees getting involved in potentially dangerous or destructive tasks which they may not have adequate training and preparation for. In the existing training methodologies, once a trainee is certified the trainee could be assigned to process products although he/she may not have had any training in process or tool troubleshooting. In most cases, ignoring initial signs of problems or not being able to respond to problems quickly, could be very costly and result in tool or process shut down. On the other hand, in some situations, initiatives by operators who have not been adequately trained and informed of their responsibilities might result in scraps, reworks, damaged tools and products, or an out of spec process. In the multilevel methodology presented herein, CMKB modules keep track of the user level and last certification date, along with scheduled training sessions and topics. In addition, these modules recommend tasks suitable for each operator and decide whether the operator should have access to process and/or tool diagnostics.

To summarize, the certification process is interactive and cooperative and is geared towards process and tool operator certification in general, and manufacturing operator certification in particular. The certification procedures test a trainee's progress, track performance and help the trainee concentrate on problem areas. The feedback and tracking capabilities are responsive to the concerns with existing certification and training procedures, which lack a meaningful and unintimidating feedback mechanism. In addition, to reduce intimidation, enhance learning and increase trainee involvement, certification is preferably expanded beyond a simple pass or fail. Certification modules can be considered an extension of training modules by providing meaningful feedback, suggesting topics to be reviewed and providing general comments, as well as constructive criticism.

Preferably, a new user needs a password and a valid user Id to take a certification test. New users are assigned USER_LEVEL="Beginner", unless a different level is assigned to them by the area supervisor. Once a trainee has reviewed all the required materials and procedures for the area, tool group and level, the trainee can be given an on-line certification test. The test might be comprised of about 20–50 questions (multiple choice and True/False) which may be answered in any order. The trainee can review an up-to-the-point status summary which shows the user responses to questions and whether a question has not been visited yet (Not Answered) or no answer has been selected for it yet (skip). Once the test is turned in, the CMKB evaluates the responses and generates a report. For each question answered incorrectly, the system lists topics, documents, or training modules to be reviewed.

Tool operating and maintenance manuals, process documents, computer system user guides, safety and emergency procedures, and hazardous material handling and disposal procedures are preferably converted to hypertext documents and made available as part of the on-line documentation. These documents are accessible from training and certification modules, as well as directly from the system front-end. External applications (e.g., diagnostic expert systems) can also utilize these documents. A document can be opened up to a specific topic or section. All documents may also be searched for a keyword or topic prior to opening. In case of multiple matches, it opens up to the first match, with the section title of all matched cases displayed in a selectable list box. A hypertext maintenance log can also be set up, so all activities related to the tool, process, or business practice can be logged in for shift-to-shift communication and long term documentation. In addition, periodic and long term maintenance activities, tool shut-downs, as well as technician/operator vacation plans can be scheduled and posted on this log.

Figure 22:
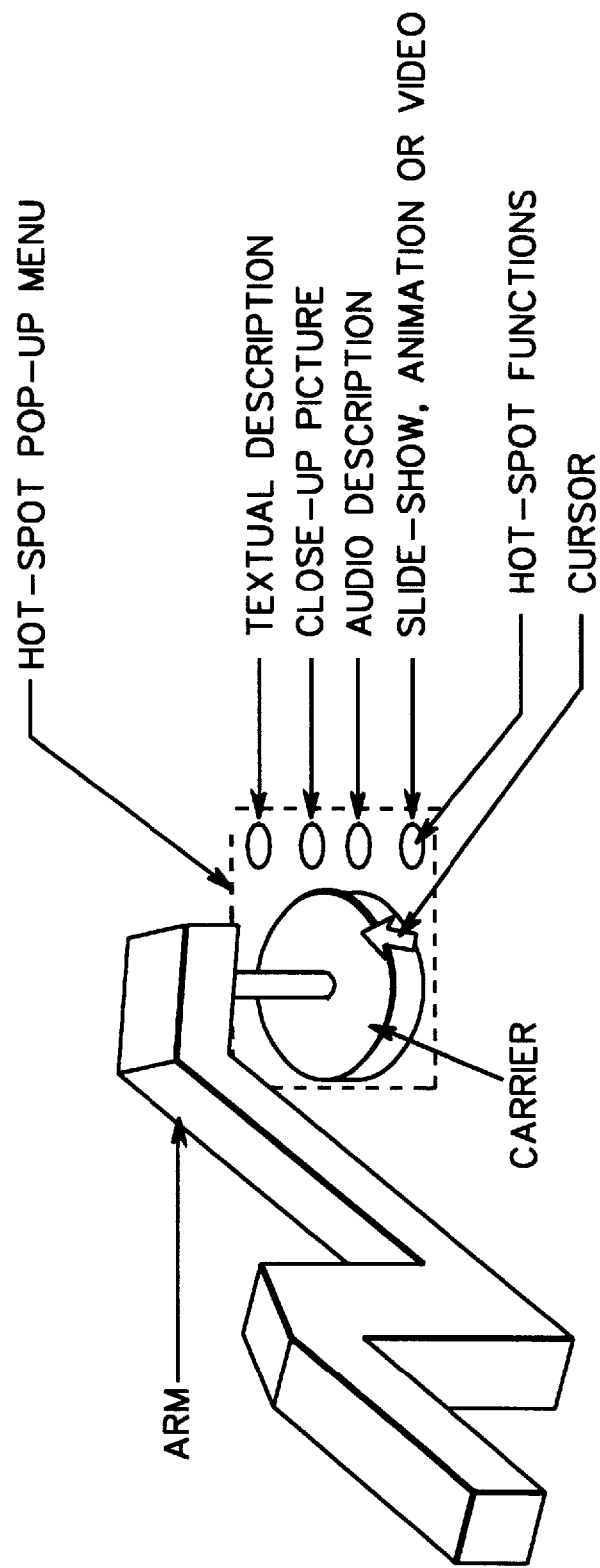
FIG. 22 is a display image representation useful in describing a hot spot pop-up menu for a hypergraphics implementation in accordance with the present invention.

Multimedia documents and training modules can be designed and developed using C, Presentation Manager (PM), Dialogue Manager (DM), OS/2 Information Presentation Facility (IPF) tagging language, and IPF compiler (IPFC). Each section in the document is assigned a unique id (e.g.:hl res=100. Polish Arm). Then any word, sentence, section, image, or hot-spot in an image can be linked to this section using a link tag (:link reftype=hd res=100.click here to review Polish Arm section:elink.). Once the document is compiled, the text ("Click here to review Polish Arm section") is uniquely highlighted so the user knows it is selectable. Pictures can also be embedded into the document as artwork (:artwork name='arm.bmp' linkfile='arm.hgl'.). The linkfile contains the description and coordinates of hot-spots defined for the image. Each hot-spot can have up to 4 functions associated with it, which can be selected from the hot-spot function pop-up menu, as shown in FIG. 22. The hot-spot functions menu is selected by clicking on the object of interest. The hot-spot functions are in fact secondary hot-spots within the primary.hot-spot window. These functions are links to other parts of the document (textual description, close-up picture) or to external applications to show an animation, display a video clip, or play audio (e.g. :link reftype=launch object='audio exe' data='calibrt.aud'. Click here to listen to calibration procedures. :elink.).

Figure 23:
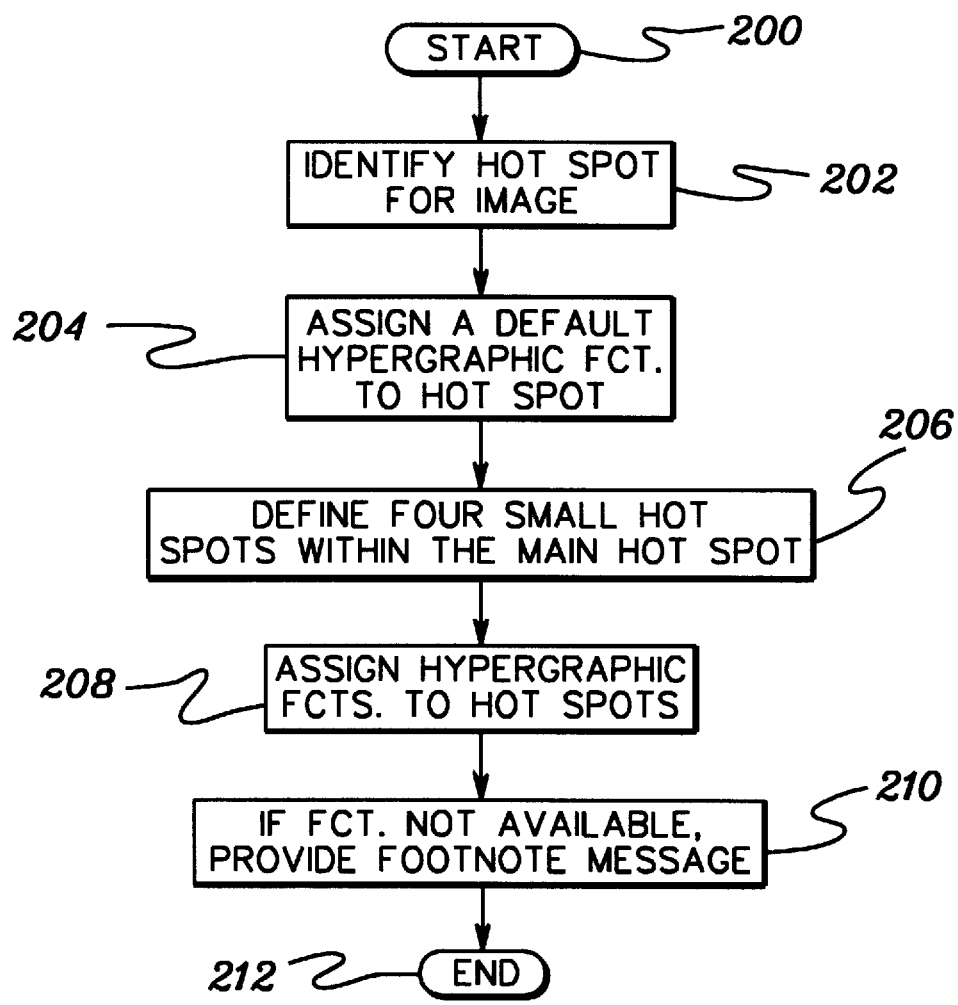
FIG. 23 is a flowchart of one embodiment of processing to create a hypergraphic hot spot in accordance with the present invention.

One processing embodiment for creating a hypergraphic function pop-up menu is presented in FIG. 23. The process begins, 200 "Start," with a "hot spot" being defined for the image, 202 "Identify Hot Spot For Image." Next, a default hypergraphic function, such as text, close-up, video, etc., is preferably assigned to the hot spot, 204 "Assign A Default Hypergraphic FCT. To Hot Spot."

Thereafter, four hot spots are defined within a main hot spot pop-up menu, using essentially the same procedure as that employed to define the main hot spot (discussed below). Each of the four hot spots serves as a menu button, and may comprise a square, for example, with a side length of approximately twenty percent the main hot spot height length. In the embodiment shown herein, the four hot spot buttons are stacked on the right-hand side of a main hot spot, 206 "Define Four Small Hot Spots Within the Main Hot Spot." Next, hypergraphic functions are assigned to the small hot spots, such as text, close-up image, audio, video/animation/slide show, 208 "Assign Hypergraphic FCTs. To Hot Spots." Preferably, hypergraphic functions are assigned in a fixed order. Finally, if one of the functions is not available, then the corresponding link is assigned a pop-up footnote with a message to that effect, 210 "If FCT. Not Available Provide Footnote Message." This completes pop-up menu setup, 212 "End."

Figure 24:
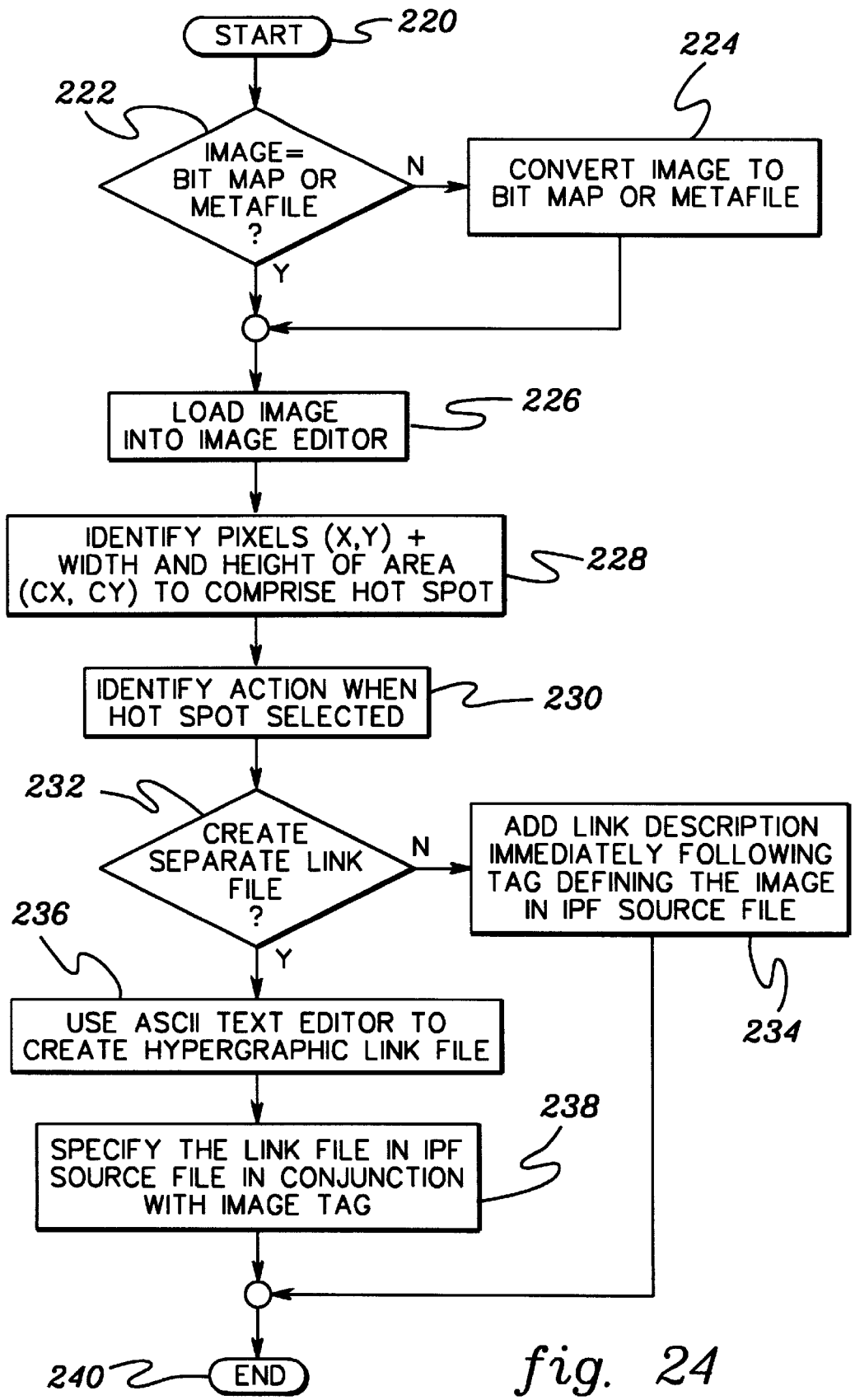
FIG. 24 is a flowchart of one embodiment of processing to create a hypergraphic function pop-up menu in accordance with the present invention.

A process for creating a hypergraphic hot spot link is next presented with reference to FIG. 24. Inquiry is initially made, 220 "Start," to ascertain whether the image is an OS/2 bit map or metafile, 222 "Image=Bit Map Or Metafile?" If "no," then a commercially available conversion program such as IBM's OS/2 Image Support program is employed to convert the image to a bit map or metafile, 224 "Convert Image To Bit Map or Metafile." Once in proper format, the image is loaded into any commercially available image editor, 226 "Load Image Into Image Editor." Next, the pixel (x,y) coordinates of the lower left corner of a rectangular area to be defined as the hot spot are identified, along with the width and height of the area desired (cx,cy), 228 "Identify Pixels (X,Y)+Width And Height Of Area (CX,CY) To Comprise Hot Spot."

The type of action to be linked to a particular hot spot is then selected. For example, jump to another section of a document→REFTYPE=hd, open a pop-up footnote window→REFTYPE=fn, launch an external application A→REFTYPE=launch, 230 "Identify Action When Hot Spot Selected." If desired a separate link file may be created, 232 "Create Separate Link File?" If "no," then the link description is added immediately following the tag defining the image in the IPF source file, 234 "Add Link Description Immediately Following Tag Defining The Image In IPF Source File." Processing is then complete, 240 "End."

If a separate link file is desired, then an ASCII Text Editor (commercially available) is employed to create a hypergraphic link file, with an extension of an *.hgl, 236 "Use ASCII Text Editor To Create Hypergraphic Link File." All hot spots for the image are defined with one link line per hot spot. Thereafter, the link file is specified in the IPF source file in conjunction with :artwork tag, 238 "Specify The Link File In IPF Source File In Conjunction With Image Tag." When separately defined, processing is complete, 240 "End."

Coordinating text, graphics and images in a multimedia environment is very important to effective presentation and management of the subject matter. Some researchers have investigated the automatic generation of coordinated multimedia. The methodology proposed herein is based on a pre-defined presentation scenario and is implemented in one of the pre-defined templates (FIGS. 16*a*–16*p*). Multimedia documents are partitioned into "Logical Pages". A logical page (FIG. 17) consists of a set of images and all their associated textual and audio description. In other words, a logical page is the pre-defined collection of all related information (text, graphics, images, audio, animation, video clips, . . . ) which the trainee should/could review when studying the subject matter covered in that page. The appearance, format, and access to logical pages are fixed and consistent throughout the system. Logical pages are related to each other via hypertext and hypergraphic links. To accommodate all possible situations and to maintain consistency among various multimedia modules developed in a organization, the library of "Logical Page Templates" is provided (FIGS. 16*a*–16*p*).

Many users of a multimedia training system such as described herein will not be sophisticated computer users, and too many features (options, menus, controls) could be confusing, and in some cases restrict the amount of control and access that CMKB modules need to preserve. For example, if the users are allowed to minimize training applications, the system would not be able to control the number of copies opened and would not know whether a task has been completed.

Figure 19:
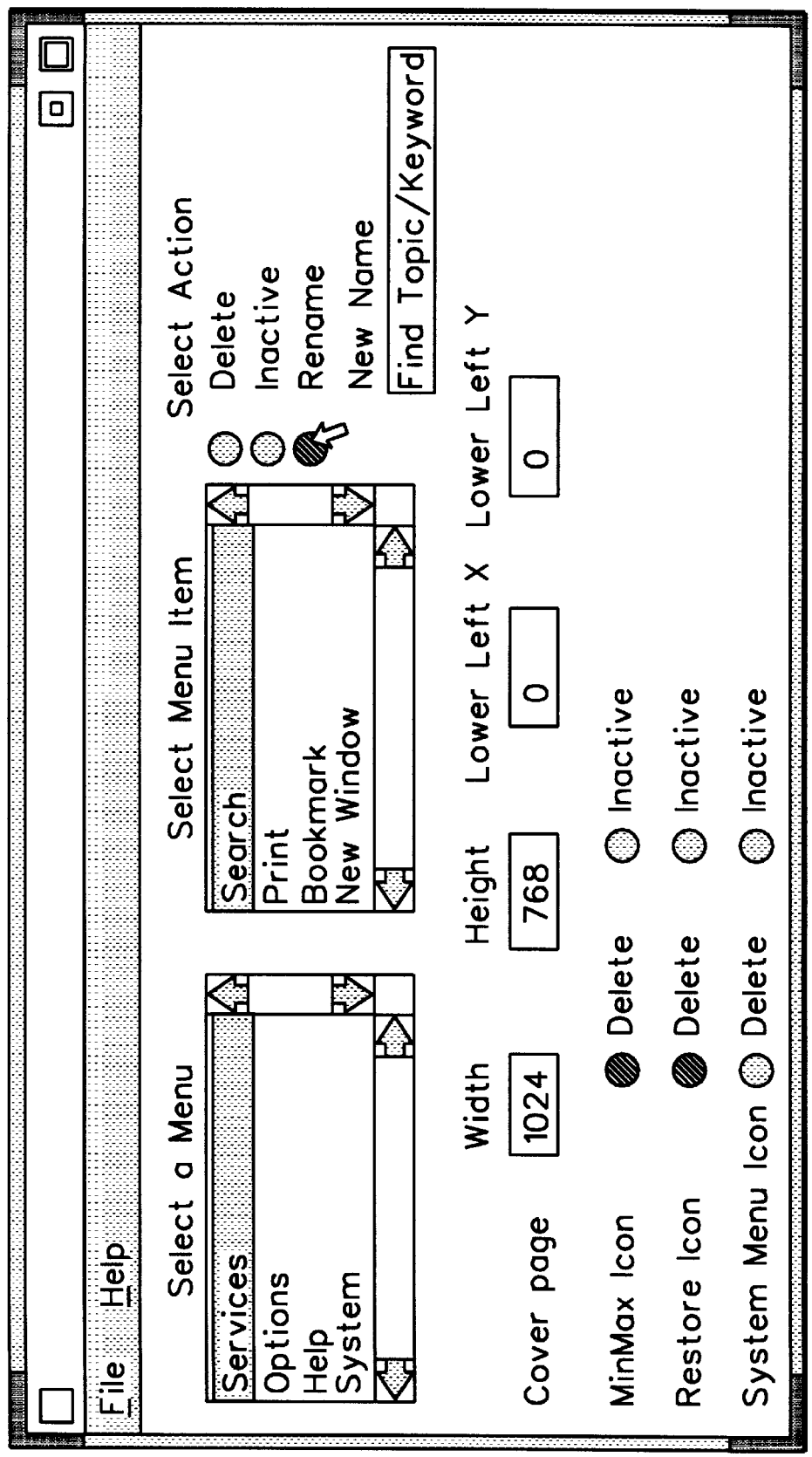
FIG. 19 is one embodiment of a logical page attribute menu useful in customizing logical page templates in accordance with the present invention.

In addition to the logical page templates described above, most of the major attributes of a logical page can be customized (FIG. 19). For example, page background color, highlight color, logical page size and position, text style and font size, pull down menus and menu items, system menu items, push buttons, vertical and horizontal scrolls, min/max icons, window titles, etc.

Multimedia in general, and motion video, animation, and audio in particular, are believed to be appealing to manufacturing personnel involved with maintenance, diagnostics, and training. However, in many cases the cost and logistics of required hardware and software is a major concern. Remember that most manufacturing facilities include tens and even hundreds of workstations. Training, certification and on-line documents have to be installed on a large number of these workstations. If an application requires special hardware or software license, the cost would become a significant roadblock. Although cost is a major concern, another problem might be the lack of any available expansion slot on some workstations in the area.

It is not practical to expect or justify upgrading all workstations with a video card (e.g., IBM's M-motion adapter card for motion video), Video Capture Adapter (for digitizing and storing of compressed video images), and the Audio Capture and Playback Adapter (ACPA). On the other hand, it is believed essential for all operators and technicians to have access to the training, certification, and documentation applications on the workstations dedicated to their own workplace, rather than on some remotely-located workstation. Therefore, alternative methods for generating and playing motion video and animation are desired.

The resulting package, referred to herein as "Poor Man's Video" (PMV), can be written in C and PM, and can be accessed from training or certification documents as an application-controlled window, as shown below:

```
:hl res=999 id=video x=center y=center width=400x height=300x
scroll=none titlebar=sysmenu rules=none hide group=6. Rapitran
Loading/Unloading Procedure
:acviewport dll='pmv' objectname='PmvMain' Objectinfo='rapid.plb'
objectid=1.
```

Figure 25:
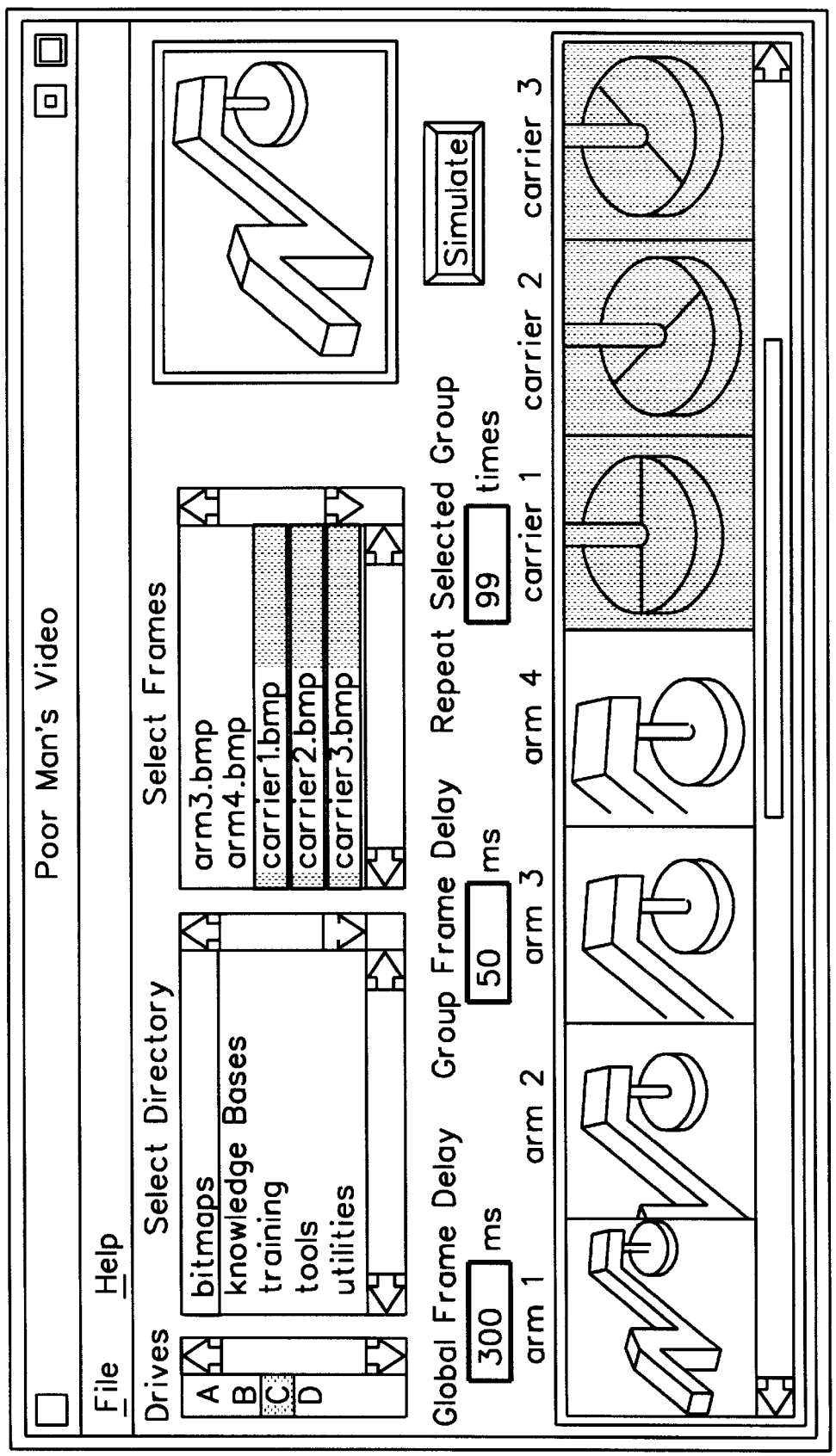
FIG. 25 is one embodiment of a main menu of a "poor man's video" (PMV) editor for authoring motion video clips in accordance with the present invention.

PMV allows the user to specify a set of OS/2 bitmaps as video frames and specify a global frame delay (1–99999 ms) or specific frame delays for each frame or a group of frames (FIG. 25). About 45 frames per second (256 color 300×400 pixels frame) can be achieved on an IBM Model 95 PS/2 (486DX2) with 32 MB RAM, with an initial load time of 7 seconds. The PMV's graphical front-end (FIG. 25) allows application developers to create video and animation clips quickly and efficiently.

PMV can generate either a "run-time" PLB (PMV Library Block) or a "compile-time" PLB. Compile-time PLBs are self-contained and can be exported to other workstations without any need for copying the images or having access to them. Run-time PLBs, on the other hand, contain pointers to the images used in the video clip or animation and therefore require access to these. In some cases, images are used in more than one animation or video clip. Run-time PLBs are more efficient in such cases since these are generated and loaded at run-time. Thus, a single copy of the frames to be used in animation or video clip only needs to be stored. When an animation or a video clip is launched, the run-time PLB loads the images on the fly, which could be time consuming for long video clips (about 1 second per frame clip on a 486 PS/2 with 32 Meg RAM). In addition, the launch would fail for run-time PLBs if the images cannot be located (moved or renamed). On the other hand, there is the storage overhead associated with compile-time PLBs since images have to be replicated and stored locally. Accessing large PLBs over the network is slow and unpredictable.

PMV has two main portions, namely, a compile/generate video and a play video function. There are four components to implement these functions. These are:

PMBC.exe→compiler

PMV.DLL→player

*.PMV→video script file (Table 1)

*.PLB→video library block

Video script is defined in either of two ways. Script can be defined manually via any text/ASCII editor or automatically via a PMV graphical front-end interface as described above. By way of example, PMV video script language format is defined in Table 1 below.

TABLE 1

```
* This .pmv file contains the description of the video clip you are creat-
ing.
* Each line has 5 fields
* 1) Frame BMP full path, 2) a unique frame id, 3) frame delay in ms
* 4) Frame group id (if any), 5) Group # of repetition
* Complete this file then compile it to create adl.plb.
* pmvc adl.pmv e:\projects\adl\adl.plb
* adl.plb is used in the ipf as shown below:
* :acviewport dll='PMV' objectname='PmvMain' objectinfo='adl.plb'
* objectid=1
* play the following frames for 300 ms
e:\projects\adl\adl1.bmp 1 300 0 0
e:\projects\adl\adl2.bmp 2 300 0 0
e:\projects\adl\adl3.bmp 3 300 0 0
e:\projects\adl\adl4.bmp 4 300 0 0
```

TABLE 1-continued

```
*
* define and repeat the group #1, 3 times, for 200 ms
e:\projects\adl\adl3.bmp 1 200 1 3
e:\projects\adl\adl4.bmp 2 200 1 3
e:\projects\adl\adl3.bmp 3 200 1 3
e:\projects\adl\adl4.bmp 4 200 1 3
*
* define and repeat the group #2, 3 times, for 100 ms
e:\projects\adl\adl3.bmp 1 100 2 3
e:\projects\adl\adl4.bmp 2 100 2 3
e:\projects\adl\adl3.bmp 3 100 2 3
e:\projects\adl\adl4.bmp 4 100 2 3
* define and repeat the group #3, 3 times, for 50 ms
e:\projects\adl\adl3.bmp 1 50 3 3
e:\projects\adl\adl4.bmp 2 50 3 3
e:\projects\adl\adl3.bmp 3 50 3 3
e:\projects\adl\adl4.bmp 4 50 3 3
*
* define and repeat the group #4, 20 times, for 5 ms
*e:\projects\adl\adl3.bmp 3 5 4 20
*e:\projects\adl\adl4.bmp 4 5 4 20
*
* define and repeat the group #5, 20 times, for 50 ms
e:projects\adl\adl3.bmp 3 50 5 20
e:projects\adl\adl4.bmp 4 50 5 20
* define and repeat the group #6, 20 times, for 150 ms
e:\projects\adl\adl3.bmp 3 150 6 20
e:\projects\adl\adl4.bmp 4 150 6 20
```

Figure 26:
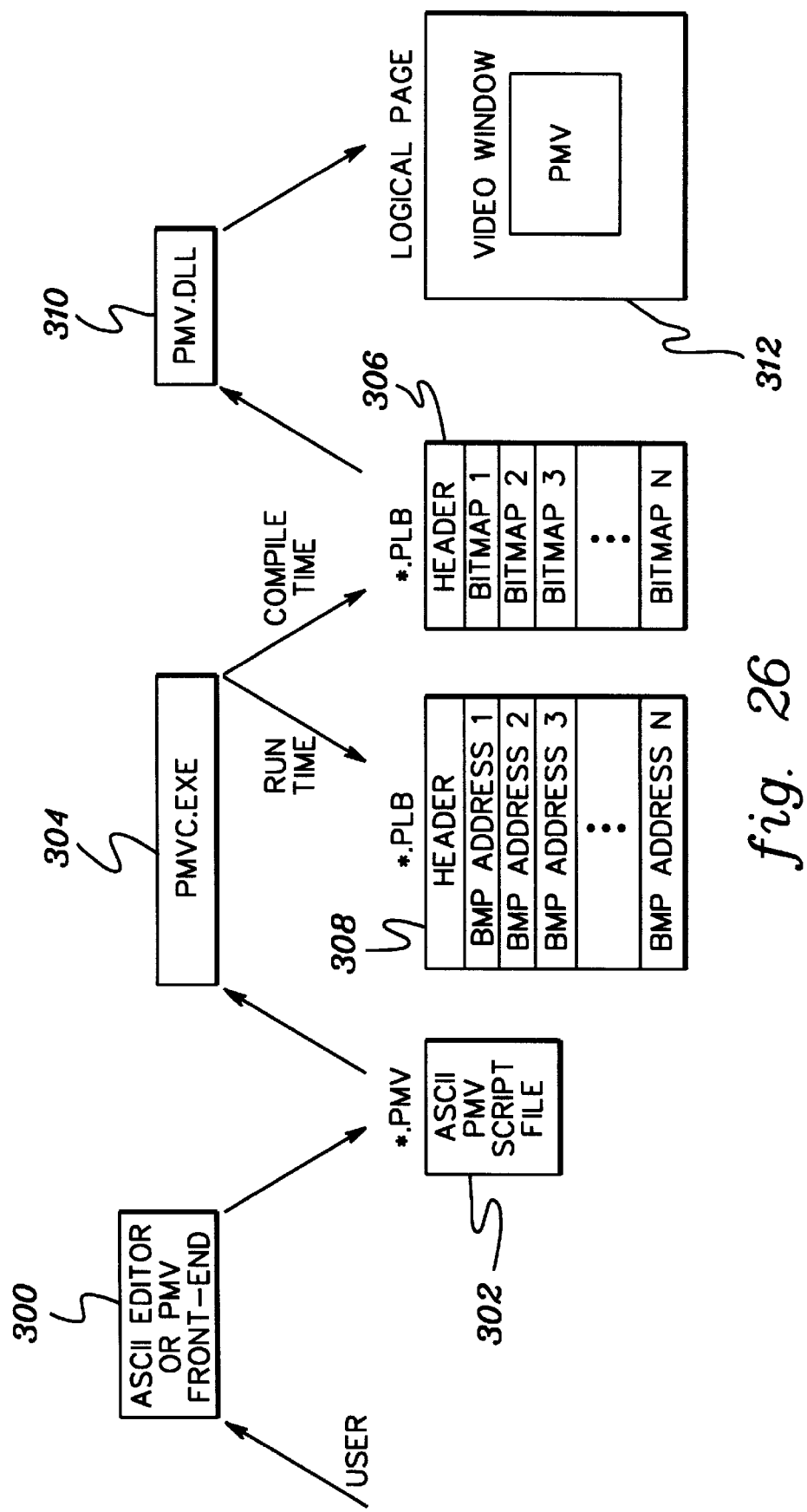
FIG. 26 graphically depicts PMV processing in both run-time and compile-time in accordance with the present invention.

FIG. 26 depicts the process in greater detail. As noted, a user employs either an ASCII editor or the PMV front-end 300 to define a PMV script file 302, referred to herein as *.PMV (See Table 1).

The compiler, PMVC.exe 304 then takes the PMV script file and compiles it into either a compile-time video library block 306 or a run-time video library block 308. The player, PMV.DLL 310, then retrieves either the compile-time library or the run-time library, and repeats each frame by the global delay, e.g., 300 msec, i.e., unless a specific frame delay is specified otherwise. The player presents the PMV within a video window in a logical page 312. Detailed embodiments of the above-described processing are presented in FIGS. 27–28.

Figure 27:
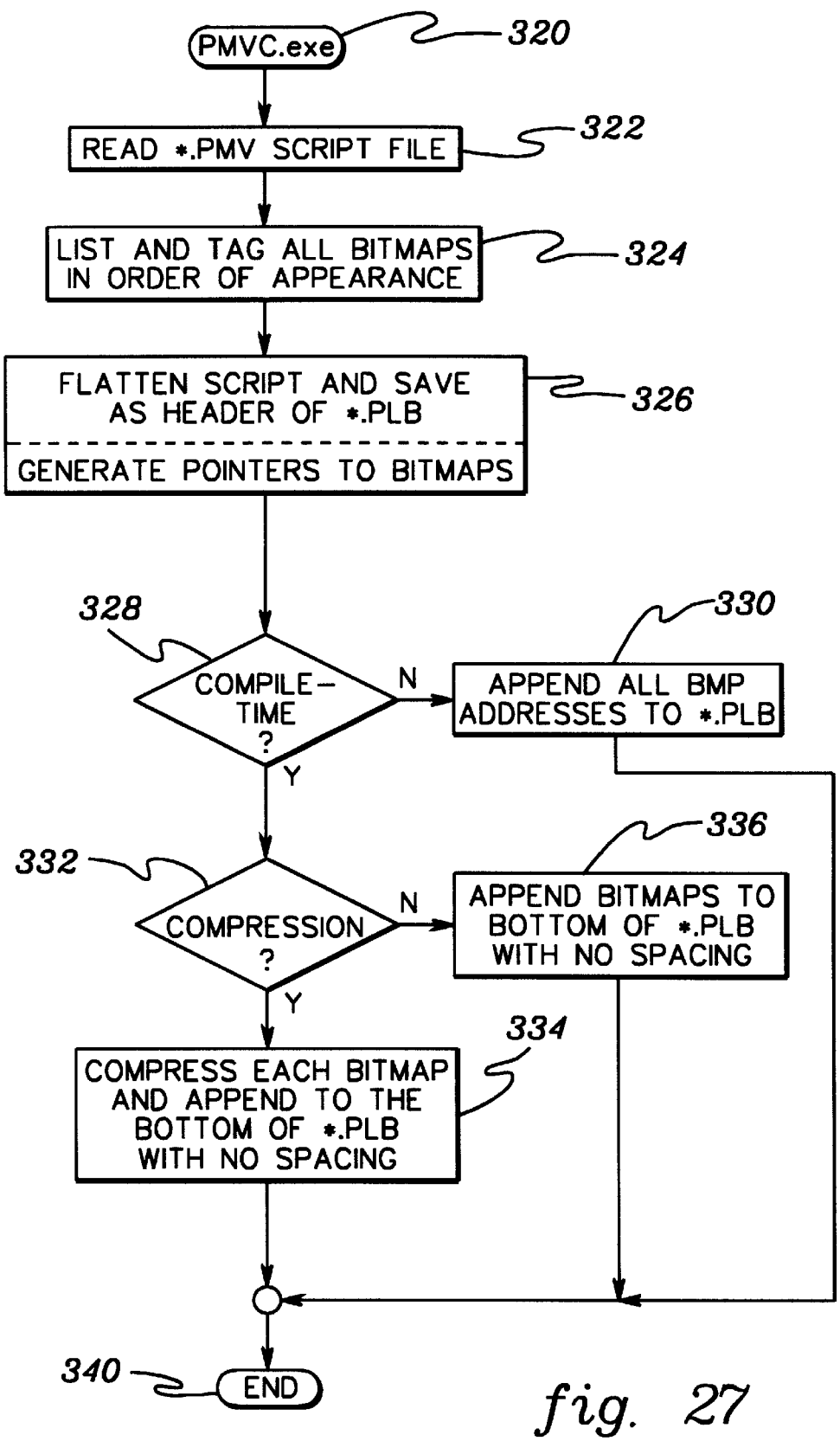
FIG. 27 is a flowchart of one embodiment of compiler processing to create a PMV library block in accordance with the present invention.

Referring first to FIG. 27, the compiler, 320 "PMVC.exe," initially reads the ASCII video script file, 322, "Read *.PMV Script File." A unique identifier is then assigned to each bit map based on order of appearance, 324 "List And Tag All Bit Maps In Order Of Appearance." The video script is then flatten and saved as a header in the video library block *.PLB in addition to loading the appropriate bit maps into the library or the bit map addresses depending upon whether compile-time or run-time is desired, 326 "Flatten Script And Save As Header Of *.PLB. Generate Pointers To Bit Maps."

Next, the compiler determines whether run-time or compile-time is desired, 328 "Compile-Time?" If "yes," then inquiry is made whether compression is needed, 332 "Compression?" If again "yes," each bit map is compressed and appended to the bottom of the play file *.PLB, 334 "Compress Each Bit Map And Append To The Bottom Of *.PLB With No Spacing." If compression is unnecessary, then the bit maps are appended to the bottom of the *.PLB file directly, 336 "Append Bit Maps To Bottom Of *.PLB." Alternatively, if run-time is desired, then the bit map addresses are appended to the video library block, 330 "Append All BMP Addresses To *.PLB." Compilation is then complete, 340 "End."

Figure 28:
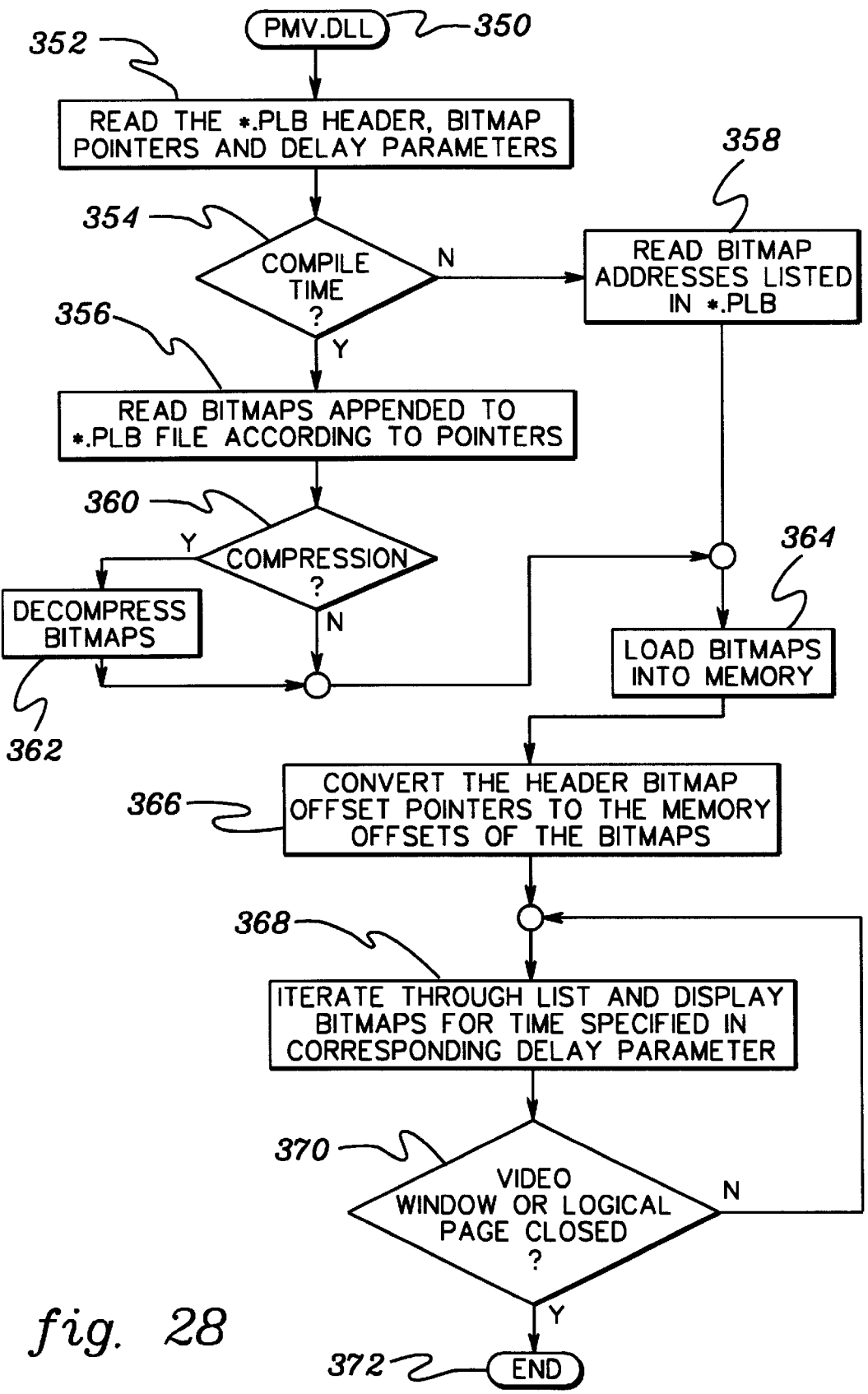
FIG. 28 is a flowchart of one embodiment of player processing for viewing a PMV in accordance with the present invention.

One processing embodiment of a PMV player is depicted in FIG. 28. As shown, the player, 350 "PMV.DLL," initially reads the video library block header and obtains the bit map pointers and delay parameters, 352 "Read The *.PLB Header, Bit Map Pointers And Delay Parameters." Next, the player determines whether the file comprises compile-time or run-time information, 354 "Compile-Time?" If compile-time, the bit maps appended to the video library block are read directly according to the bit map pointers and loaded into memory, 356 "Read Bit Maps Appended To *.PLB File According To Pointers." If run-time, then the bit map addresses are read from the video library block and loaded into memory, 358 "Read Bit Map Addresses Listed In *.PLB."

Processing next determines whether compression of the bit maps has occurred, 360 "Compression?" If "yes," then the bit maps are decompressed, 362 "Decompress Bit Maps." Thereafter, the bit maps are loaded into memory, 364 "Load Bit Maps Into Memory."

The header information is next converted into bit map pointers and bit map delays, 366 "Convert The Header Bit Map Offset Pointers To The Memory Offsets Of The Bit Maps." The player then iterates through the video display list displaying the bit maps for the specified time, 368 "Iterate Through List And Display Bit Maps For The Time Specified In Corresponding Delay Parameter." The process is continued until the user or the application closes the video window or the logical page, 370 "Video Window Or Logical Page Closed?" If "yes," playing is complete, 372 "End."

PMV can be used for pseudo animation using graphic bit maps or still images with 500 ms to 1 second of frame delay. Alternatively, a true animation tool from IBM called AnDes (Animated Design) can be used, which allows animated models to be created using Excelerator, marketed by Intersolv Inc. of Rockwell, Md., based on Ward & Mellor methodology Parameswaran, T., "Structured Design of Real Time Systems," Proc. of National Workshop on Software Reliability Engineering, WSRE92, (1992), which is based on transformation graphs and state transition diagrams. Excelerator models are then converted to AnDes format, before they can be animated. Although AnDes offers a true animation capability, in most cases use of PMV is believed preferable to avoid the overhead associated with installing Excelerator, AnDes, and Prolog for creating and performing animation.

Although specific embodiments of the present invention have been illustrated in the accompanying drawings and described in the foregoing detailed description, it will be understood that the invention is not limited to the particular embodiments described herein, but is capable of numerous rearrangements, modifications and substitutions without departing from the scope of the invention. The following claims are intended to encompass all such modifications.

I claim:

1. A processing method for an expert system responsive to external information inputted by a user of the expert system, said processing method comprising the steps of:
   (a) inferentially processing information in a hierarchically-structured knowledge base interactively with the external information inputted by the user of the expert system; and
   (b) during said processing step (a), non-inferentially accessing information in at least one predefined utility separate from the hierarchically structured knowledge base.

2. The processing method of claim 1, further comprising the step of displaying said non-inferentially accessed information of step (b).

3. The processing method of claim 2, wherein said non-inferentially accessible information of step (b) comprises multimedia displayable information, and wherein said displaying step includes displaying multimedia displayable information in a multimedia format selected by the user of the expert system.

4. The processing method of claim 1, wherein said hierarchically-structured knowledge base comprises a multi-level knowledge base and wherein said processing step (a) comprises inferentially processing information in said multi-level knowledge base interactively, at different levels of the multi-level knowledge base, with the external information inputted by the user of the expert system.

5. The processing method of claim 4, wherein said processing step (a) comprises inferentially processing information in the multi-level knowledge base interactively at each level with the external information inputted by the user of the expert system such that the user of the expert system influences said inferential processing at each level of the multi-level knowledge base.

6. The processing method of claim 1, wherein said hierarchically-structured knowledge base comprises a multi-level knowledge base, and wherein said processing (a) comprises inferentially processing information in said multi-level knowledge base interactively with the external information inputted by the user of the expert system, and wherein said external information is inputted by the user of the expert system during said processing step (a).

7. The processing method of claim 1, wherein an uppermost level of said hierarchically-structured knowledge base comprises a behavioral knowledge level.

8. The processing method of claim 1, wherein an intermediate level of said hierarchically-structured knowledge base comprises a structural knowledge level.

9. The processing method of claim 1, wherein a lowermost level of said hierarchically-structured knowledge base comprises an action level.

10. A processing method for an expert system responsive to external information inputted by a user of the expert system, said processing method comprising the steps of:

inferentially processing information in a hierarchically-structured knowledge base interactively with the external information inputted by the user of the expert system;

during said inferentially processing, non-inferentially accessing information in at least one predefined utility separate from the hierarchically-structured knowledge base; and wherein said hierarchically-structured knowledge base comprises a hierarchical decomposition having three levels consisting of an uppermost level comprising a behavioral knowledge level, a middle level comprising a structural knowledge level and a lowermost level comprising an action level, and wherein said inferentially processing step includes processing through said hierarchically-structured knowledge base from the behavioral knowledge level through the structural knowledge level to the action level.

11. The processing method of claim 10, further in combination with predefining said hierarchically-structured knowledge base, said predefining employing a Knowledge Editor that implements a plurality of guidelines that force predefining of the hierarchically-structured knowledge base into a hierarchical decomposition having said three distinct levels.

12. The processing method of claim 10, further comprising displaying said non-inferentially accessed information from said at least one predefined utility.

13. The processing method of claim 12, wherein said non-inferentially accessed information of said displaying comprises multimedia displayable information, and wherein said displaying step includes displaying multimedia/hypermedia displayable information in a multimedia/hypermedia format selected by the user of the expert system.

14. The processing method of claim 10, wherein said processing step (a) comprises inferentially processing information in the hierarchically-structured knowledge base interactively with the external information inputted by the user of the expert system such that the user of the expert system interactively influences inferential processing of multiple levels of the hierarchically-structured knowledge base.

15. The processing method of claim 10, wherein said step (b) comprises non-inferentially accessing information in multiple predefined utilities separate from the hierarchically-structured knowledge base, at least some of said multiple predefined utilities being coupled to different levels of said hierarchically-structured knowledge base.

16. A processing method for an expert system responsive to external non-inferential information, said processing method comprising the steps of:

(a) inferentially processing information in a hierarchically-structured knowledge base, said inferentially processing being triggered by said external non-inferential information; and (b) during said processing step (a), non-inferentially accessing information in at least one predefined utility separate from the hierarchically-structured knowledge base, said non-inferentially accessed information comprising pertinent information resulting from said inferentially processing (a).

17. The processing method of claim 16, wherein said inferentially processing (a) comprises inferentially processing information in the hierarchically-structured knowledge base cooperatively with the external non-inferential information.

* * * * *